United States Patent
Bell

(10) Patent No.: US 11,580,115 B2
(45) Date of Patent: Feb. 14, 2023

(54) IDENTIFICATION OF INTENT AND NON-INTENT QUERY PORTIONS

(71) Applicant: eBay Inc., San Jose, CA (US)

(72) Inventor: Anthony Robert Bell, San Jose, CA (US)

(73) Assignee: eBay Inc., San Jose, CA (US)

( * ) Notice: Subject to any disclaimer, the term of this patent is extended or adjusted under 35 U.S.C. 154(b) by 638 days.

(21) Appl. No.: 15/637,872

(22) Filed: Jun. 29, 2017

(65) Prior Publication Data
US 2019/0005044 A1    Jan. 3, 2019

(51) Int. Cl.
| | | |
|---|---|---|
| G06F 16/20 | (2019.01) | |
| G06F 16/30 | (2019.01) | |
| G06F 16/2457 | (2019.01) | |
| G06F 16/28 | (2019.01) | |
| G06F 16/35 | (2019.01) | |

(52) U.S. Cl.
CPC ...... *G06F 16/24578* (2019.01); *G06F 16/285* (2019.01); *G06F 16/353* (2019.01)

(58) Field of Classification Search
CPC . G06F 16/353; G06F 16/285; G06F 16/24578
See application file for complete search history.

(56) References Cited

U.S. PATENT DOCUMENTS

| 8,996,495 B2 | 3/2015 | Rehman |
|---|---|---|
| 2003/0195877 A1 | 10/2003 | Ford et al. |
| 2005/0131872 A1 | 6/2005 | Calbucci et al. |
| 2006/0122979 A1* | 6/2006 | Kapur ............... G06F 16/3326 |
| 2006/0190439 A1* | 8/2006 | Chowdhury ........ G06F 16/3331 |
| 2008/0243905 A1 | 10/2008 | Pavlov et al. |

(Continued)

FOREIGN PATENT DOCUMENTS

| CN | 103620604 A | 3/2014 |
|---|---|---|
| CN | 104428767 A | 3/2015 |

OTHER PUBLICATIONS

International Search Report received for PCT Patent Application No. PCT/US2018/033334, dated Aug. 7, 2018, 3 pages.
International Written Opinion received for PCT Patent Application No. PCT/US2018/033334, dated Aug. 7, 2018, 11 pages.

(Continued)

*Primary Examiner* — Kristopher Andersen
(74) *Attorney, Agent, or Firm* — Shook, Hardy & Bacon LLP

(57) ABSTRACT

Methods and systems for improved categorization of queries are disclosed. In one aspect, first queries having query results limited to a particular category are identified. Second queries including a first query are also identified. For identified second queries, a pattern is generated based on the second query and the included first query, and a rank of the first query's particular category in results for the second query and a percentage of the second query's results having a category equivalent to the included first query's particular category are determined. The ranks and percentages are aggregated for matching patterns, and second patterns with aggregated ranks and percentages meeting a criterion are determined. Results for a third query are limited to a category equivalent to a particular category for a first query included in the third query, and then transmitted over a computer network to a client device.

20 Claims, 16 Drawing Sheets

(56) References Cited

U.S. PATENT DOCUMENTS

| | | | |
|---|---|---|---|
| 2010/0094854 A1* | 4/2010 | Rouhani-Kalleh | ............................ G06F 16/3325 707/706 |
| 2012/0191688 A1 | 7/2012 | Bolivar | |
| 2012/0203778 A1 | 8/2012 | Riley et al. | |
| 2012/0221557 A1 | 8/2012 | Edmonds et al. | |
| 2012/0265779 A1 | 10/2012 | Hsu et al. | |
| 2012/0265787 A1* | 10/2012 | Hsu | ..................... G06F 16/3322 707/780 |
| 2013/0080362 A1 | 3/2013 | Chang et al. | |
| 2014/0380285 A1 | 12/2014 | Gabel et al. | |
| 2016/0179807 A1 | 6/2016 | Kumar et al. | |
| 2018/0052884 A1 | 2/2018 | Kale et al. | |

OTHER PUBLICATIONS

Wikipedia, "Bloom filter—Wikipedia", The Free Encyclopedia, retrieved from the Internet URL: <https://en.wikipedia.org/wiki/Bloom_filter >, accessed on Sep. 22, 2019, 15 pages.

International Preliminary Report on Patentability Received for Application No. PCT/US2018/033334, dated Jan. 9, 2020, 13 pages.

Office Action Received for Korean Patent Application No. 10-2019-7037282, dated Jan. 29, 2021, 12 pages (6 pages of Official Copy and 6 pages of English Translation).

Extended European search report Received for European Patent Application No. 18824740.7, dated Nov. 23, 2020, 10 pages.

Office Action Received for Chinese Patent Application No. 201880036685.1, dated Oct. 9, 2022, 12 Pages (1 Page of English Translation & 11 pages of official Copy).

* cited by examiner

IDENTIFICATION OF INTENT AND NON-INTENT QUERY PORTIONS

TECHNICAL FIELD

The present disclosure generally relates to text processing, and specifically to the processing of search queries.

BACKGROUND

As use of the Internet has become more pervasive across the globe, queries for information are becoming central to accessing many Internet based services. For example, Internet users submit queries to shop for items they intend to purchase on an electronic commerce (e-commerce) site. One reason people shop for items online is that purchasing online is perceived to be easier and faster. Frequently, Internet shoppers value their time than non-internet shoppers. Thus, an e-commerce site that can process a shopper's query and provide the shopper with pertinent results quickly will be more likely to capture a sale from that shopper. In contrast, if an e-commerce site processes a shopper's query such that the shopper is required to exert a greater amount of effort in finding items they seek, there is a higher probability the shopper may move on to a competitive e-commerce site. Therefore, proper handling of e-commerce queries is important to obtaining a high percentage of potential revenue available from shoppers visiting an e-commerce site. As a result, improved methods and systems for query processing are required.

SUMMARY

The disclosed methods and systems improve an ability to process a query so as to determine an intent of a user issuing the query. For example, the user may have an intent to identify goods of a particular category. Identification of the proper category of results may enable a web application to display query results that are more relevant to the user. Additionally, the category of results may, in some aspects, be a category of goods and/or services available on an e-commerce site. The category of goods and/or services may define attributes of the goods/services. For example, when shopping for clothes, a size is frequently an attribute relevant to shoppers. In contrast, size may be less relevant or even inappropriate to an automotive parts shopper. Instead, make, model, and year of a vehicle may be more relevant attributes to the automotive parts shopper. Thus, proper identification of a category of goods or services sought by a shopper may enable further improvements in a shopper's ease of use, by potentially enabling identification of attributes included in the query.

The disclosed methods and systems increase an ability for a query response system to limit results of a query to those most likely to be of a category of goods and/or services sought by the shopper. The disclosed methods and systems analyze both historical queries and predetermined queries subject to automatic categorization to determine a core portion of a query and a non-core or ancillary portion of the query. The non-core or ancillary portion of the query does not effect a category of good/services sought by an issuer of the query (such as a shopper on an ecommerce system). In other words, core portions of a query reveal a shopper's intent with respect to a category of goods and/or services, while ancillary portions of the query do not effect that core intent. Thus, categorization of these queries may rely on only the core portion while effectively ignoring non-intent or ancillary portions of the query, at least with respect to selecting a category of results to return in response to the query.

The improved categorization of the disclosed methods and systems is provided, in some aspects, by maintaining a first mapping of first queries to categories. When a first query is received, results of the first query from an item database may be filtered such that only results of a particular category provided by the mapping are returned. In some aspects, a query entered by a user must exactly match the first query of the first mapping in order for results of the query to be automatically filtered to only those items included in the category specified by the first mapping. Additional words or tokens in the query may prevent this exact match, resulting in no filtering of the query results in some aspects.

The disclosed methods and systems also analyze historical results of previous queries. The historical query results may include those of queries that were not automatically categorized. For example, the historical queries may not have matched an entry in the first mapping described above, and thus, results of the queries were not filtered to items matching the category specified in the first mapping. Thus, the results presented for these historical queries were of a variety of categories. The user may have then selected results of a particular category. This selection may have been recorded in a log file or in some other manner. From this information, a second mapping of historical queries to second categories of items sought by the user issuing the query can be obtained.

The first mappings and second mappings may be combined to improve query categorization. At a high level, the disclosed methods and systems analyze the historical queries to identify those that include an embedded first query (included in the first mapping). If historical results of a particular historical query are generally consistent with a categorization provided by the embedded first query alone, then the historical query may be categorized according to the embedded first query.

One aspect disclosed is a method of categorizing query results. The method includes identifying first queries having query results that are limited to a particular category, identifying unique second queries that include a first query, for each identified second query: generating a pattern based on the identified second query and the included first query, determining a rank of the first query's particular category in results for the identified second query, and determining a percentage of the identified second query's results having a category equivalent to the included first query's particular category. The method also includes aggregating the ranks and percentages for matching patterns, determining second patterns based on the aggregated ranks and percentages that meet a criterion, categorizing a third query matching one of the second patterns according to a first query included in the third query, and generating results for the third query according to the categorization.

In some aspects of the method, the first queries are identified based on a database mapping the first queries to their particular category. Some aspects of the method include searching a historical query database to identify the unique second queries, the historical query database mapping historical queries to respective categories. In some aspects of the method, generating a pattern comprises generating a string substituting the first query within the second query for a predetermined string. In some aspects of the method, determining second patterns based on the aggregated ranks and percentages that meet the criteria comprises accumulating the percentages for matching patterns ranked first, and including matching patterns in the second patterns in response to the accumulated percentage being above a threshold.

In some aspects of the method include excluding patterns with fewer than a threshold number of matching patterns from the second patterns. Some aspects of the method include receiving first and second queries from one or more databases, and receiving the third queries from a client device over a network. In some aspects of the method, categorizing the third query comprises: identifying a first query included in the third query based on the matching second pattern, determining a particular category for the first query; and limiting results for the third query to items of the particular category. In some aspects of the method, generating results for the third query comprises transmitting the limited results over a computer network to a client device.

In some aspects of the method, generating the results for the third query further comprises: determining an attribute value for the category of the third query based on the third query and the first query included in the third query; and further limiting the results of the third query to items having the determined attribute value. In some aspects of the method, determining the attribute value comprises determining an ancillary token based on the third query and the first query included in the third query, determining one or more attributes associated with the category of the third query, determining attribute values for the determined attributes, determining one or more token values based on the ancillary token, and assign the token value to the attribute value in response to the values being of a compatible type. In some aspects of the method, aggregating the ranks and percentages comprises averaging or determining a median value for the ranks and percentages.

Another aspect disclosed is a query results categorization system. The system includes one or more hardware processors, configured to identify first queries having query results that are limited to a particular category, identify unique second queries that include a first query, for each identified second query: generate a pattern based on the identified second query and the included first query, determine a rank of the first query's particular category in results for the second query, and determine a percentage of the second query's results having a category equivalent to the included first query's particular category, aggregate the ranks and percentages for matching patterns, determine second patterns based on the aggregated ranks and percentages that meet a criterion, categorize a third query matching one of the second patterns according to a first query included in the third query, and generate results for the third query according to the categorization. In some aspects of the system, generating a pattern comprises generating a string substituting the first query within the second query for a predetermined string. In some aspects of the system, determining second patterns based on the aggregated ranks and percentages that meet the criteria comprises accumulating the percentages for matching patterns ranked first, and including matching patterns in the second patterns in response to the accumulated percentage being above a threshold.

In some aspects of the system, categorizing the third query comprises: identifying a first query included in the third query based on the matching second pattern, determining a particular category for the first query; and limiting results for the third query to items of the particular category. In some aspects of the system, generating results for the third query comprises transmitting the limited results over a computer network to a client device. In some aspects of the system, generating the results for the third query further comprises: determining an attribute value for the category of the third query based on the third query and the first query included in the third query; and further limiting the results of the third query to items having the determined attribute value.

In some aspects of the system, determining the attribute value comprises determining an ancillary token based on the third query and the first query included in the third query, determine one or more attributes associated with the category of the third query, determine attribute values for the determined attributes, determine a token values based on the ancillary token; and assign the token value to the attribute value in response to the values being of a compatible type.

Another aspect disclosed is a non-transitory computer readable storage medium comprising instructions that when executed cause a processor to perform a method of categorizing query results. The method includes identifying first queries having query results that are limited to a particular category, identifying unique second queries that include a first query, for each identified second query: generating a pattern based on the identified second query and the included first query, determining a rank of the first query's particular category in results for the identified second query, and determining a percentage of the identified second query's results having a category equivalent to the included first query's particular category. The method also includes aggregating the ranks and percentages for matching patterns, determining second patterns based on the aggregated ranks and percentages that meet a criterion, categorizing a third query matching one of the second patterns according to a first query included in the third query, and generating results for the third query according to the categorization.

BRIEF DESCRIPTION OF THE DRAWINGS

Various ones of the appended drawings merely illustrate example embodiments of the present disclosure and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Figure 1:
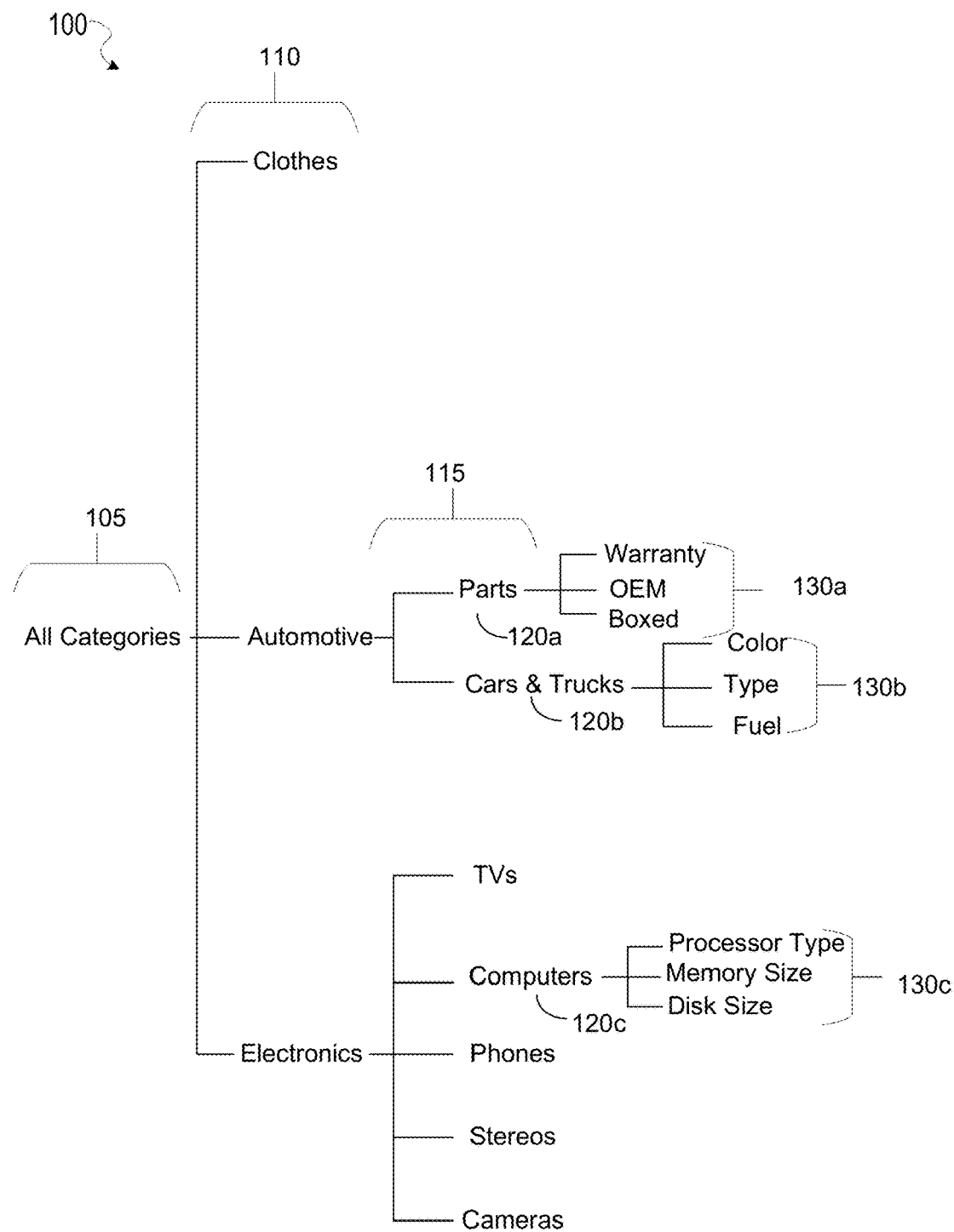
FIG. 1 illustrates an exemplary database taxonomy.

FIG. 1 illustrates an exemplary database taxonomy. The taxonomy 100 includes a root level 105 called "All Categories." Within the root level 105, categories 110 form a first level of categorization. Each category 110 may include one or more subcategories 115. For example, clothes, automotive, and electronics are categories 110 in the exemplary taxonomy 100. Parts, cars & Trucks, TVs, Computers, Phones, Stereos, and Cameras are subcategories 115 in the exemplary taxonomy 100, as each subcategory 115 applies to items within only a single category 110. In contrast, taxonomy 100 also includes attributes 130a for the parts sub-category 120a, attributes 130b for the cars & trucks sub-category 120b, and attributes 130c for the computers sub-category 120c.

The disclosed methods and systems may provide for an improved ability to automatically categorize results for a query received by a query response system. For example, when a query is received, the disclosed methods and systems may enhance an ability to provide results for the query that are within a single category 110 or subcategory 115. This filtering of results for specific categories is designed to provide query results to a user more related to items they seek via the query. While categories 110 and subcategories 115 are illustrated as distinct in FIG. 1, for purposes of understanding the disclosed embodiments, use of the term category or subcategory may be considered equivalent. For example, references a category in the description of the methods and systems below may be considered to include references to a sub-category in some aspects.

The disclosed methods and systems also provide additional advantages. In some aspects, these methods and systems may enhance automatic identification of attributes 130 for a particular category 110 or subcategory 115 within a received query. By identifying category attributes 130 included within a query, results of the query may be further limited to items having the identified attributes. This further targets the results of the query to those of particular interest by a user submitting the query. The more on target the query results are, the higher the level of customer satisfaction with the query search process. This may lead to additional revenue realization by an operator of the query response system and/or their business partners.

Figure 2A:
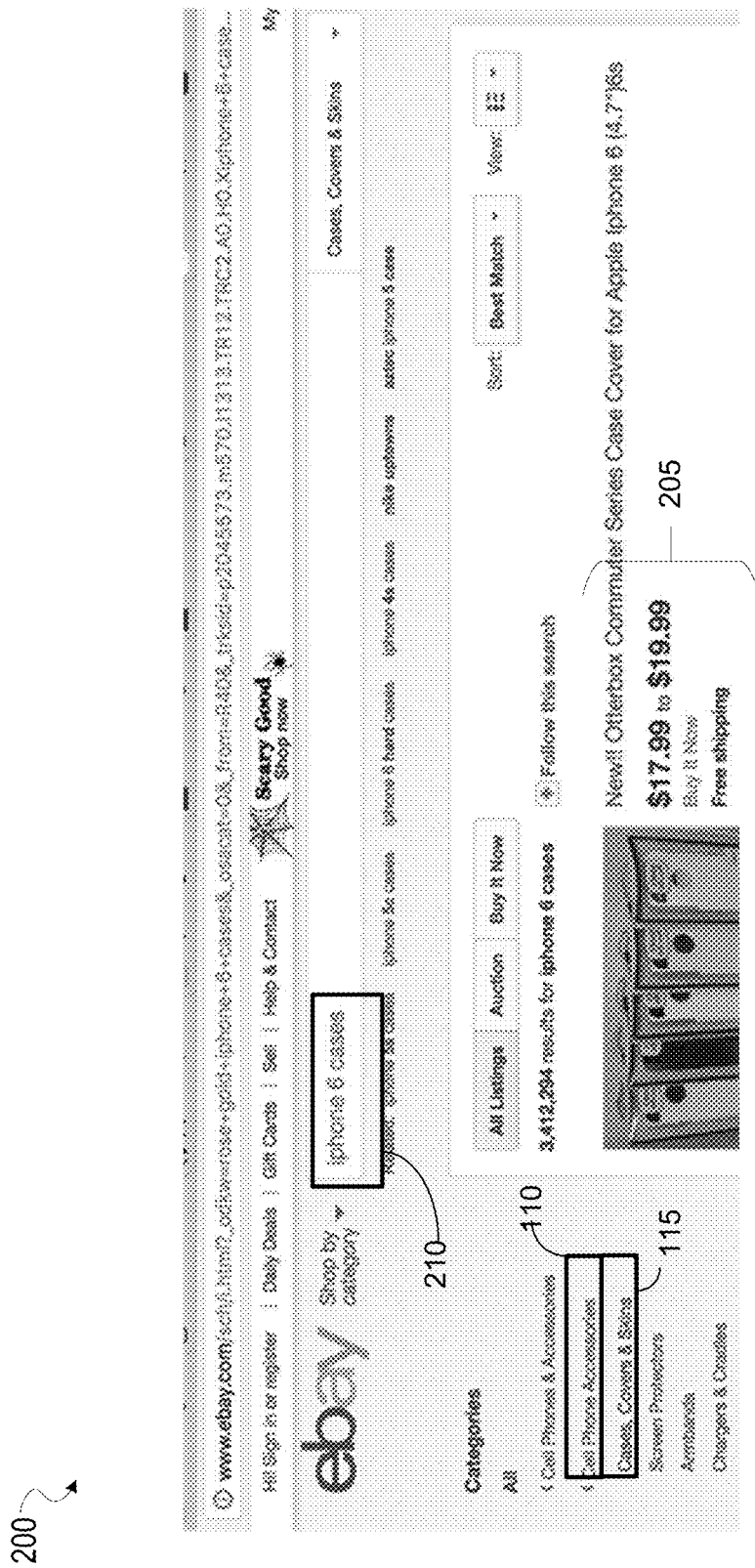
FIG. 2A shows a web interface providing results of a query entered via the web interface.

FIG. 2A shows a web interface 200 providing results 205 of a query 210 entered via the web interface 200. The query 210 includes the words "iphone 6 cases." The results 205 shown in FIG. 2A demonstrate that the sub-category 115 of "Cases, Covers, & Skins" was identified by the query response system implementing the web interface 200 based on the query 210. The web interface 200 shows that the subcategory 115 is within the category 110 of "Cell Phone Accessories." Thus, FIG. 2A shows an embodiment of automatic query categorization, which provides for filtering of query results to those of a particular category, based on the query 210 alone. In some aspects, the disclosed methods and systems may achieve this automatic query categorization via a automatic categorization database, which maps particular queries to particular categories. If a query entered as query 210 was requested by a user, if the query, as a whole, is included in the automatic query categorization database, then the results of the query may be filtered or limited to those results matching the category indicated by the automatic categorization database. The automatic categorization shown in FIG. 2A may encounter challenges however, when, for example, additional terms are included in the query, such that the query entered by a user does not match a query in the automatic categorization database, as shown below with respect to FIG. 2B.

Figure 2B:
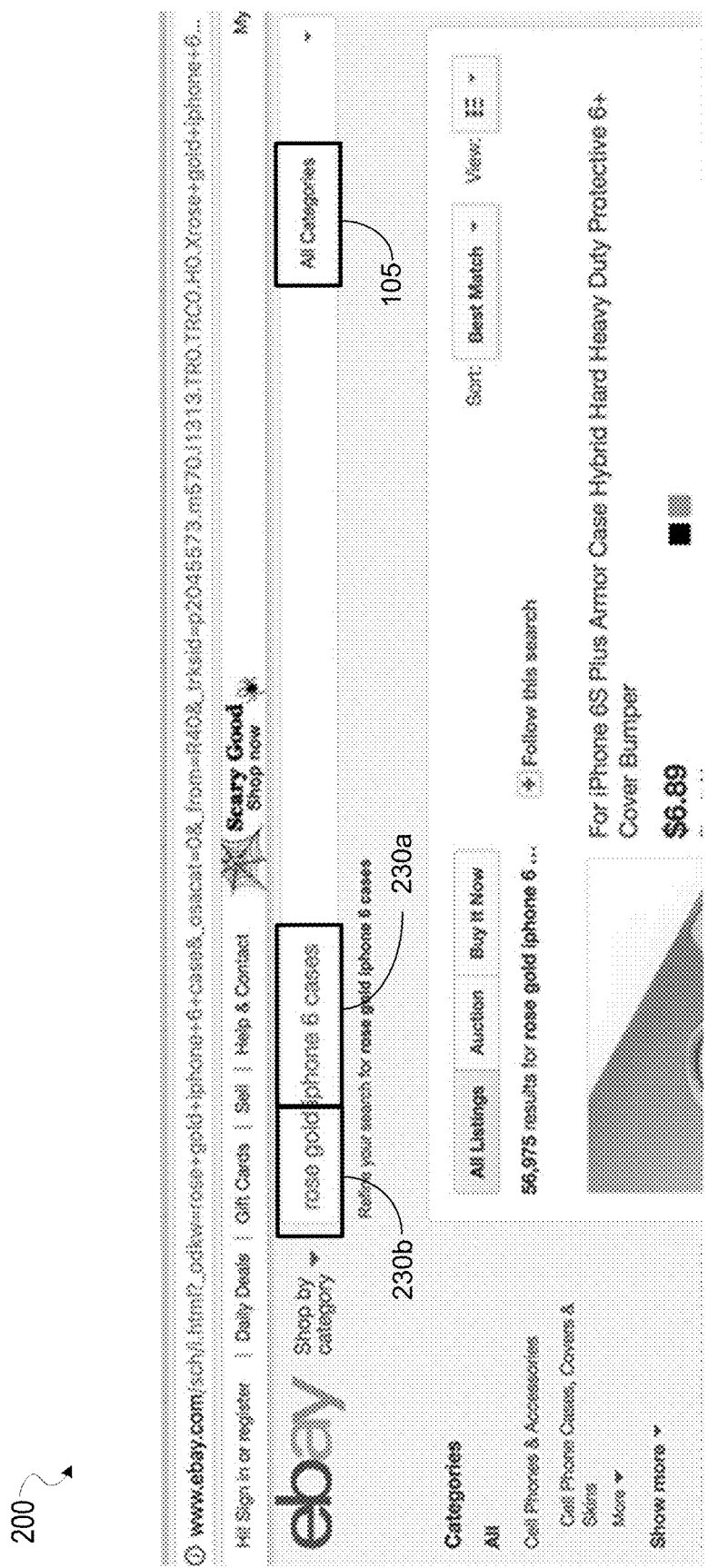
FIG. 2B shows the web interface providing results of a second query entered via the web interface.

FIG. 2B shows the web interface 200 providing results of a second query entered via the web interface 200. The query 230 includes the words 230a from the query 210 "iphone 6 cases" but also includes additional terms 230b "rose gold." FIG. 2B shows that when the additional terms 230b are included in the query 230, a category 110 or subcategory 115 (as shown in FIG. 1 for example) the user seeks is not identified by the e-commerce system providing the web interface 200. Instead, the category of results provided by the web interface 200 are in the broader category 105 "all categories," and thus, may be less relevant to the user's intent than the results provided in FIG. 2A.

One explanation for the differing results between the query of FIG. 2A and FIG. 2B may be that the query 210 of FIG. 2A may have occurred frequently enough, that there is a high statistical correlation between the query 210 and the sub-category 115. This high level of correlation may be established by a large sample size of historical queries matching query 210 and corresponding previous results indicating users issuing the query 210 were interested in the sub-category 115. In contrast, the query 230 of FIG. 2B may be performed less frequently than the query 210. In some cases, historical use of the query 230 may be of a quantity less than a threshold, such that the system implementing the web interface 200 is unable to establish a correlation between the query 230 and a category 110 or sub-category 115, even if the user entering query 230 has a shopping intent similar to that of a user entering the query 210.

Some of the disclosed implementations may extend the ability to categorize query results via the automatic categorization database discussed above with respect to FIG. 2A, by correlating the automatic categorization database with other data obtained from historical queries and historical results of interest to users issuing those historical queries. In some aspects, results of historical queries that were of interest may be indicated by click through data on those results.

The disclosed methods and systems enable a query response system providing query results as shown in the exemplary web interface 200 to identify a core portion of a query, namely, in this example, the portion of the query 230a, and to identify an ancillary portion of the query 230b. Identification of the core portion 230a and the ancillary portion 230b may facilitate more precise categorization of query results, improving the user experience and ultimately providing for increased revenue to a provider of the query results.

Figure 3:
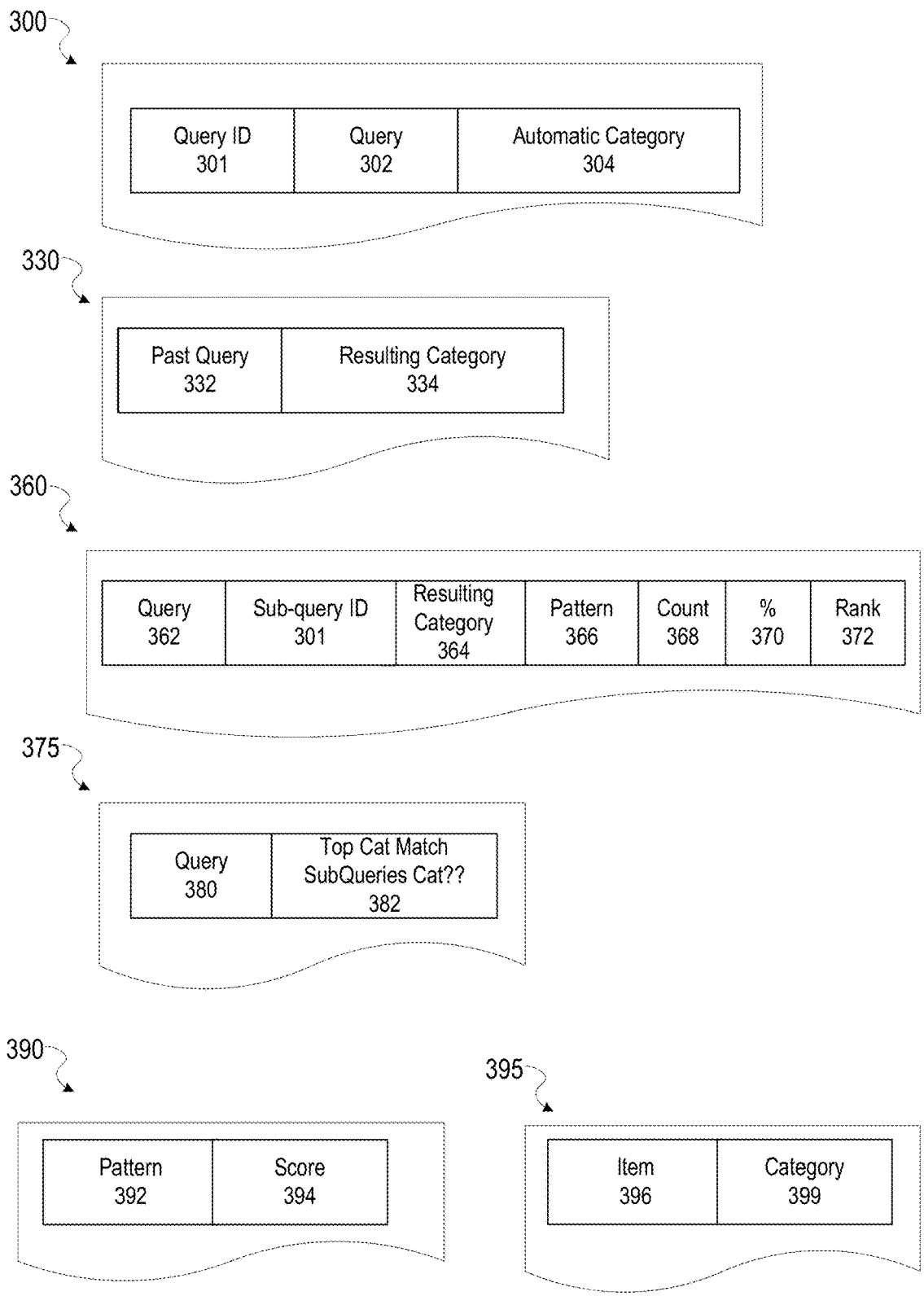
FIG. 3 shows a number of exemplary database tables that may be utilized in the disclosed embodiments.

FIG. 3 shows a number of exemplary database tables that may be utilized in the disclosed embodiments. The exemplary database tables described below with respect to FIG. 3 are presented as examples, and do not limit the disclosed embodiments to the example implementations described. Furthermore, while each of tables below are described with an exemplary set of columns, the disclosed methods and systems are not limited to implementations utilizing only those columns or all of those columns. Various aspects may include additional or fewer columns of data than those described below.

FIG. 3 shows an automatic categorization database 300, a historical query database 330, a query statistics database 360, a category match database 375, a pattern database 390, and an inventory items database 395.

The automatic categorization database 300 includes a query id column 301. The automatic categorization database 300 also includes a queries column 302, and an automatic query column 304. The query id column 301 is a unique identifier for the query 302. The automatic categorization database 300 indicates queries 302 for the item database 390 discussed below, for which query results of a particular category 304 may be automatically provided. In other words, in some aspects, a query response system may, without further human input, provide query results only of the category 304 when receiving the query 302 for the item database 390. The query results may be obtained from the inventory items database 395, discussed further below.

The historical query database 330 includes queries 332 previously received by the query response system. The historical query database 330 also includes a resulting category 364 for items (e.g. goods or services) selected from results of the past query 332. For example, in some aspects, the historical query database 330 may be generated from log files of the query response system (e.g. an e-commerce system). The log files may capture queries typed or otherwise entered by users of the e-commerce system. These queries may be stored in the past query field 332.

The query response system may further record selection operations of query results for the past query 332. For example, since a past query 332 may not result in automatic categorization of the query results, results in multiple categories may be provided in a result list for the past query 332. In some aspects, after reviewing these results, a user issuing the past query 332 may click through on one or more results of a particular category. This click through data may be utilized in some aspects to indicate that their past query 332 was intended to identify items of the particular category. This particular category may be stored in the resulting category column 334.

In some aspects, the query statistics database 360 may be generated based on the automatic categorization database 300 and the historical query database 330. In some aspects, a portion of the past queries 332 include, as a substring or sub-query of the past query 332, a query 302 from the automatic categorization database 300. These past queries 332 may have a row in the query statistics database 360, and be equivalent to the query 362.

In some aspects, multiple past queries 332 from the historical query database 330 include the same query 302 as a substring. If these multiple past queries 332 resulted in different resulting categories 334, there may be multiple entries in the query statistics database 360 for the same query 332. While database 330 includes a row for each past query, database 360 includes a row for each unique category 334/364 resulting from each unique past query 332 that includes as a substring, a query 302. The sub-query id column 301 stores the identifier 301 for the query 302 of the automatic categorization database 330 that is included as a sub-query in the query 362.

A resulting category column 364 stores the resulting category for the query 362, similar to the resulting category 334 for the past query 332.

A value stored in the pattern column 366 is generated by replacing the sub-query 301 portion of query 362 that matches the included query 301 with a generic or common string (also referred to herein as a placeholder). For example, if an exemplary value for a query 302 is "Pontiac GTO," and an exemplary value of query 362 is "Pontiac GTO Judge", the pattern 366 may be "<Query> Judge" in some aspects. "<Query>" is the placeholder in this example.

The count column 368 counts the number of past queries 332 that are equivalent to the query 362 and have the resulting category 364.

The percentage column 370 stores a percentage of the total number of past queries 332 from the historical query database 330 that match query 362, and resulted in the resulting category 364.

The rank column 372 may be generated after all count entries 368 are generated for at least a unique query 362 value. The rank column 372 indicates an ordinal rank of a value in the count field 368 relative to other values in other count fields 368 for rows of the query statistics database 360 having equivalent query 362 values.

FIG. 3 also illustrates a top category match database 375. Top category match database 375 stores a query 380. The query 380 may be equivalent to a query 362 stored in the query statistics database 360. The top category match column 382 indicates whether the queries 380 top resulting category matches an automatically applied category for a sub-query included in the query 380. For example, query 380 may include a query 302 from the automatic categorization database 300. The query 302 has an associated automatic category 304. Column 382 reflects whether this automatic category 304 for the sub-query 382/query 302 matches the resulting category 364 for the query 362 equivalent to the query 380 when the rank column 372 is equivalent to one (1).

FIG. 3 also illustrates a pattern database 390. The pattern database 390 includes a pattern column 392 and a score column 394. The pattern database 390 stores patterns 366 that have a rank of one (1) in the rank column 372. The score column 394 stores an aggregated score based on all entries for the pattern 366 included in the query statistics database 360.

FIG. 3 also illustrates an exemplary items database 395. The items database 395 stores item information 396 and a category for the item in a column 399. The queries discussed herein may query information from the items database 395 in some embodiments. Each item in the items database 395 includes a category 110 and/or subcategory 115 as shown in the taxonomy 100 of FIG. 1. Items in the item database 395 may also optionally include one or more attributes, as also shown in the exemplary taxonomy of FIG. 1.

Figure 4:
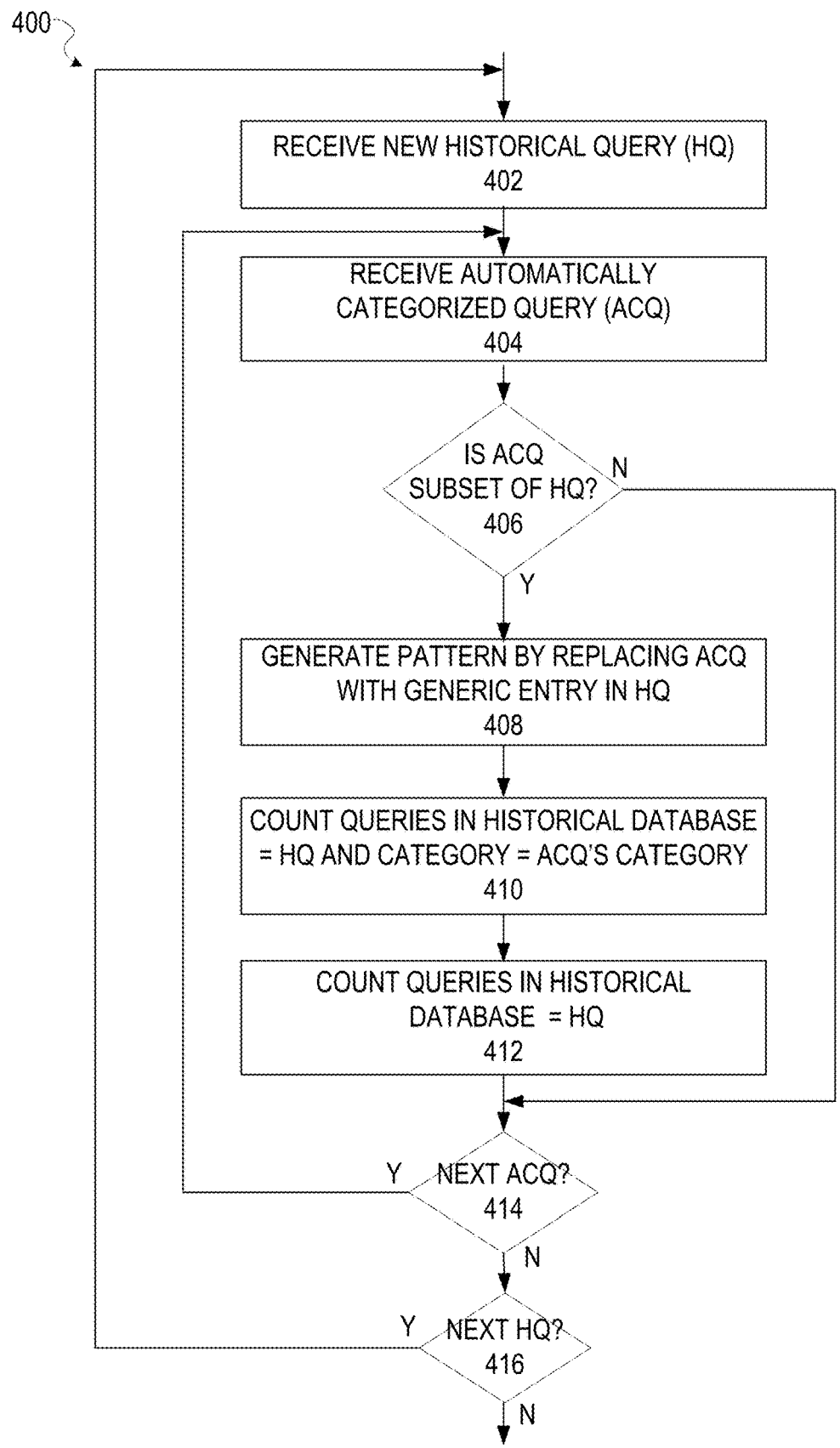
FIG. 4 is a flowchart of a method of generating statistics for a set of queries.

FIG. 4 is a flowchart of a method of generating statistics for a set of queries. The query statistics generated by process 400, discussed below with respect to FIG. 4, may be utilized to determine how to categorization of results for some portion of the set of queries. In some aspects, one or more of the functions discussed below with respect to FIG. 4 may be performed by one or more hardware processors. For example, in some aspects, instructions 1408 (discussed below) stored in a hardware memory 1410 (discussed below) may configure the one or more hardware processors (1406 discussed below) to perform the one or more functions discussed below with respect to FIG. 4. In some aspects, instructions in the query categorizer 1345 may configure one or more hardware processors 1406 to perform one or more of the functions discussed below with respect to FIG. 4.

In block 402, a new historical query (HQ) is received. In some aspects, the HQ is received from the historical queries database 330, discussed above with respect to FIG. 3. Because the historical queries database 330 may include duplicate queries in the past query field 332, block 402 may de-duplicate these queries. In other words, if a query has previously been processed, it may not be processed again in block 402 in some aspects. In some aspects, block 402 may skip a query 332 that has previously been processed.

In block 404, an automatically categorized query (ACQ) is received or obtained. In some aspects, the ACQ of block 404 is obtained from the database 300, and specifically from the query column 302, discussed above with respect to FIG. 3.

Decision block 406 determines if the ACQ received in block 404 is included within, or is a subset of, the historical query (HQ) received in block 402. For example, if the historical query is "rose gold iphone case," and the automatically categorized query (ACQ) is "iphone case," then decision block 406 would determine that the ACQ is included within, or is a subset of the historical query (HQ). In this case, process 400 moves to block 408, which generates a pattern by replacing ACQ with a generic entry in the historical query (HQ). For example, block 408 may generate a pattern "rose gold <query>", replacing the ACQ of "iphone case" with the generic <query>. In some aspects, block 406 may insert a row into the query statistics database 360, recording the generated pattern into the pattern column 366.

In block 410, the number of queries in the historical database that are equivalent to the HQ of block 402, and including a resulting category 334 equivalent to the ACQ of block 404 is determined. Block 410 may also write an entry into the query statistics database 360, recording the determined number, for example, in the count column 368. In some aspects, block 410 may also count the number of times the query HQ resulted in each unique category 334. This information may also be stored in the query statistics database 360 in the count column 368. Thus, for example, if the query HQ in the historical query database resulted in five unique resulting categories 334, block 410 may set five rows of the query statistics database 360, one for each unique resulting category.

Block 412 may count the total number of queries in the historical database 330 that have a past query column 332 equivalent to the HQ received in block 402. This information may be utilized to determine a percentage of the queries HQ having the ACQ category as a resulting category 364. For example, in some aspects, the value determined in block 410 divided by the total number of queries as determined in block 412 may provide the percentage. The percentage may also be written to the query statistics database 360, for example, in column 370.

Decision block 414 determines whether there are additional ACQ queries in the automatic queries database 300. If there are, process 400 returns to block 402, and the next ACQ query is evaluated against the same HQ.

If no more ACQ queries remain, process 400 may also determine rank information for each row of the query statistics database 360. For example, the values in the count column 368 of each row for a unique historical query may be ranked, and the rank stored in the rank column 372. Therefore, a row of the query statistics database 360 having a largest count column 368 may be ranked with a value of one (1) in the rank column 372. A second largest count column 368 may be ranked with a value of two (2) in the rank column 372, and so on.

After all ACQ queries have been compared against a historical query, then process 400 moves to block 416, which evaluates whether additional unique historical queries remain in the historical queries database 330. If additional historical queries remain to be evaluated, process 400 returns to block 402. Otherwise, process 400 continues.

In one aspect, a result of process 400 is the query statistics database 360 illustrated in FIG. 3.

Figure 5:
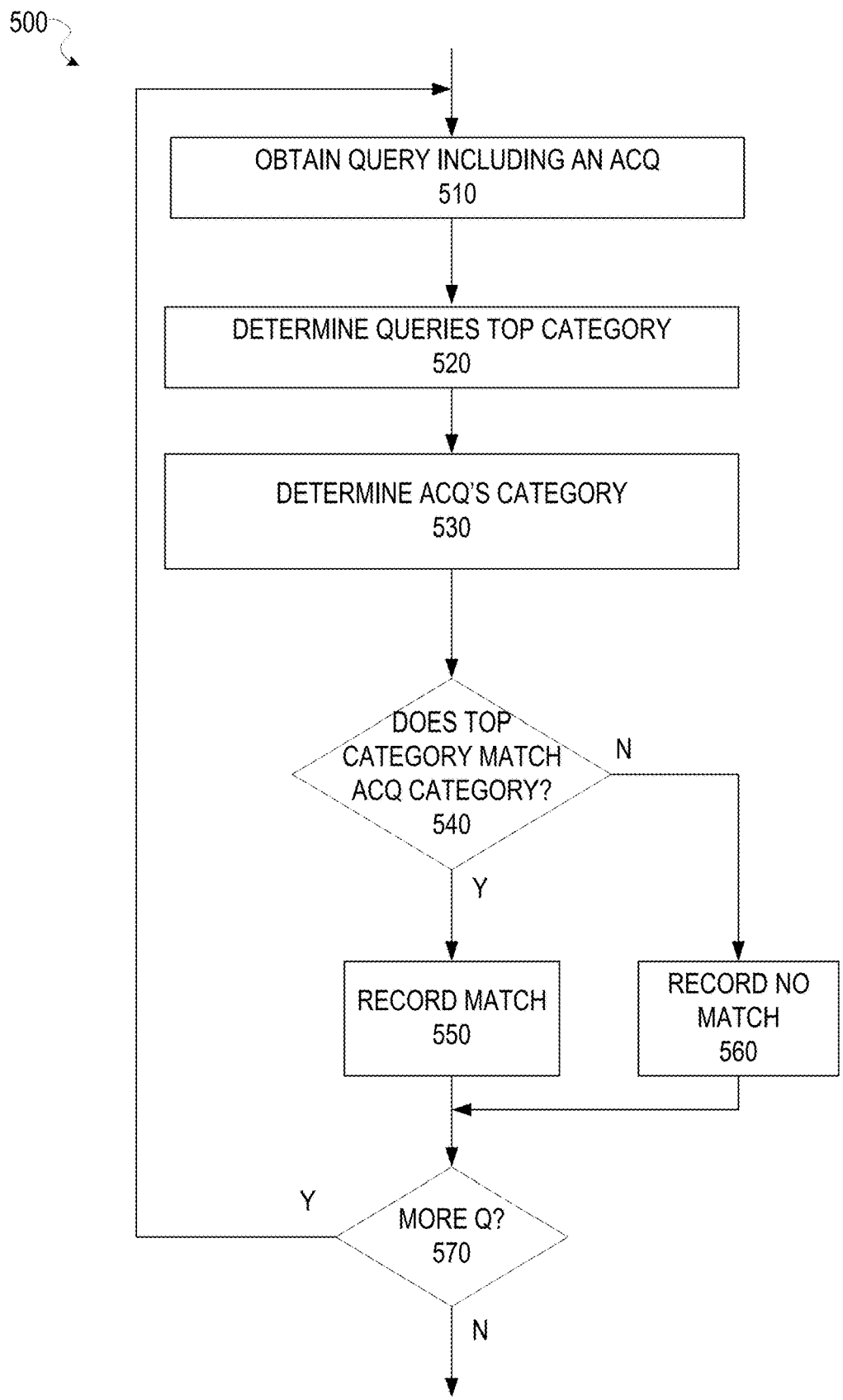
FIG. 5 is a flowchart for determining whether a query's top category matches an automatic category of a sub-query included in the query.

FIG. 5 is a flowchart for determining whether a historical query's (e.g. 332) most frequently indicated historical category (e.g. 334) is equivalent to a category (e.g. 304) of a sub-query (e.g. 302) included in the historical query (e.g. 332). If a user issuing the historical query demonstrates interest (e.g. via selection) of query results having a category aligned with an embedded query, this may indicate that additional information included in the query (i.e. ancillary information not included in a "core" portion of the query) is not affecting the category of interest. Thus, in this case, the disclosed methods and systems may, under certain conditions, determine that results from the historical query should be filtered to those of the category provided by the embedded query. Process 500, discussed below with respect to FIG. 5, supports this determination by determining whether the most frequent category of interest for a historical query (e.g., 334) is equivalent to an embedded query's (e.g. 302) category (e.g. 304).

In some aspects, one or more of the functions discussed below with respect to FIG. 5 may be performed by one or more hardware processors. For example, in some aspects, instructions 1408 (discussed below) stored in a hardware memory 1410 (discussed below) may configure the one or more hardware processors (1406 discussed below) to perform the one or more functions discussed below with respect to FIG. 5. In some aspects, instructions in the query categorizer 1345 may configure one or more hardware processors 1406 to perform one or more of the functions discussed below with respect to FIG. 5.

In block 510, a query including an automatically categorized query is obtained. In some aspects, the query may be obtained from the query statistics database 360, and specifically from column 362.

Block 520 determines the queries 362 top category. In some aspects, block 520 may scan the rows of the query statistics database 360 to identify rows matching the query of block 510. Block 520 may further count the number of occurrences of each unique resulting category (e.g. 334). The most numerous resulting category (e.g. 334), as indicated by the resulting category having the largest count (e.g. highest count column 368) may be determined by block 520. In some aspects, block 410 of FIG. 4 may perform at least some of the counting functions described above. For example, in some aspects, block 410 may initialize the count column 368 of the query statistics database 360, and block 520 may rely on the count information in the query statistics database 360 to determine the top category.

Block 530 determines an automatic category for a sub-query included in the query of block 510. In some aspects, this may be determined by consulting the automatic categorization database for the sub-query (302) identified via the sub-query id field 301. The automatic category 304 associated with the query 302 may be the automatic category determined by block 530 in some aspects.

Decision block 540 determines whether the category determined in block 530 matches the category determined in block 520. If the categories are equivalent, the match is recorded in block 550. If they do not match, the failure to match is recorded in block 560. The results in block 550 and 560 may be recorded, in some aspects, in column 382 of the matching database 375.

If there are additional queries to process in decision block 570, process 500 returns to block 510.

Figure 6:
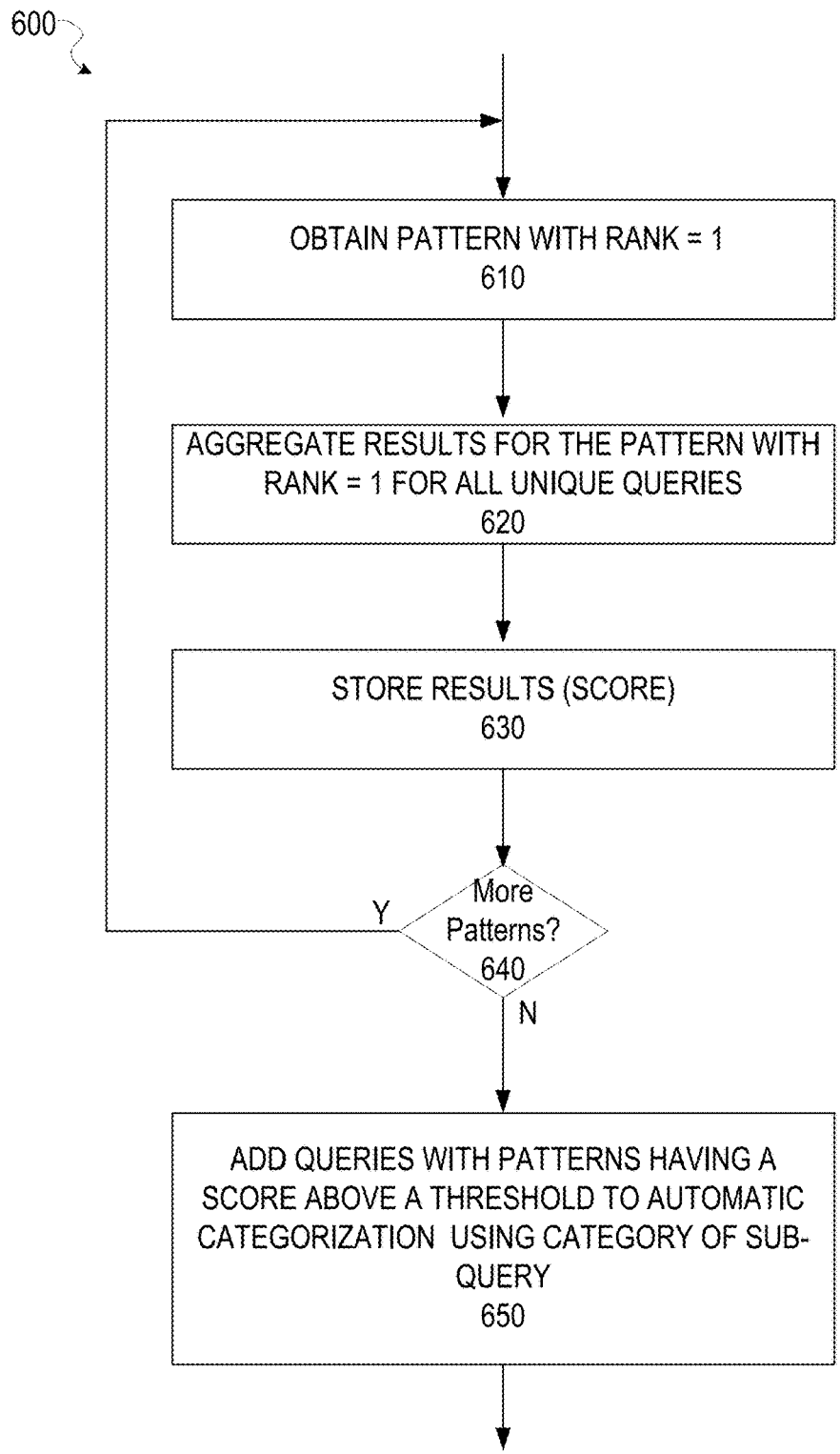
FIG. 6 is a process for determining a score for a pattern.

FIG. 6 is a process for determining a score for a pattern. In some aspects, process 600, discussed below with respect to FIG. 6, may work in conjunction with process 400 and process 500, discussed above with respect to FIGS. 4 and 5 respectively. For example, process 400 may generate query statistics that may be utilized to support further determinations in process 500, such as determining whether a query's most frequent resulting category is aligned with a category for an embedded sub-query, as discussed above. Once query level statistics are generated via processes 400 and/or 500, pattern level statistics may then be determined by process 600. For example, as part of the statistical gathering of processes 400 and 500, patterns within historical categories may be determined. For example, one historical query may be "red iphone," while another may be "red corvette." Both of these very different queries may share a common pattern, that of "red <query>". Process 500 answers the question as to whether results of each of these queries, when considered individually, differs from the category of the embedded sub-query (i.e. "iphone" or "corvette"). Process 600 determines if a particular pattern (e.g. red <query>) is consistent in this regard. By identifying consistency within patterns that occur in quite different historical queries, process 600 may understand core portions of a query and ancillary portions of a query, in that a core portion may effect item categories of interest by a query issuer, whereas ancillary portions generally do not affect the category of interest.

In some aspects, one or more of the functions discussed below with respect to FIG. 6 may be performed by one or more hardware processors. For example, in some aspects, instructions 1408 (discussed below) stored in a hardware memory 1410 (discussed below) may configure the one or more hardware processors (1406 discussed below) to perform the one or more functions discussed below with respect to FIG. 6. In some aspects, instructions in the query categorizer 1345 may configure one or more hardware processors 1406 to perform one or more of the functions discussed below with respect to FIG. 6.

In block 610, a pattern is obtained. In some aspects, the pattern may be associated with a query 362 including a query 302 eligible for automatic categorization (identified via the sub-query ID column 301 in some aspects). In some aspects, the pattern may be obtained from the pattern column 366 of the query statistics database 360.

In block 620, results for the pattern are aggregated where the rank for the pattern is one (1). In other words, block 620 seeks to determine a frequency with which a query matching the pattern has the same desired results as its embedded sub query. To determine this, in some aspects, rows in the query statistics database 360 having a pattern column 366 equivalent to the pattern 610 and a rank value in the rank column 372 of one (1) are aggregated. In some aspects, aggregating results may include averaging the results or determining a median value for the results. For example, first, rows in the query statistics database 360 having equivalent pattern columns 366 may be identified. These patterns are the pattern of block 610. Then, in some aspects, an average of the percentage column 370 for these rows of the query statistics database 360 with a rank column 372 equivalent to one (1) may be determined. In other aspects, a median value of the percentage column 370 may be determined.

In block 630, the aggregated results are stored. In some aspects, the results may be stored in the pattern database 390, for example, in the score column 382 for the pattern 380 determined in block 610.

If there are additional patterns in block 640 to analyze, process 600 returns to block 610. Otherwise, process 600 moves to block 650. In block 650, patterns having a score above a threshold are identified. Queries that quality for the pattern are then recorded for automatic categorization. For example, if a pattern of "red <query>" has a score above a threshold, then a query matching this pattern will be automatically categorized according to the string included in <query>.

Figure 7:
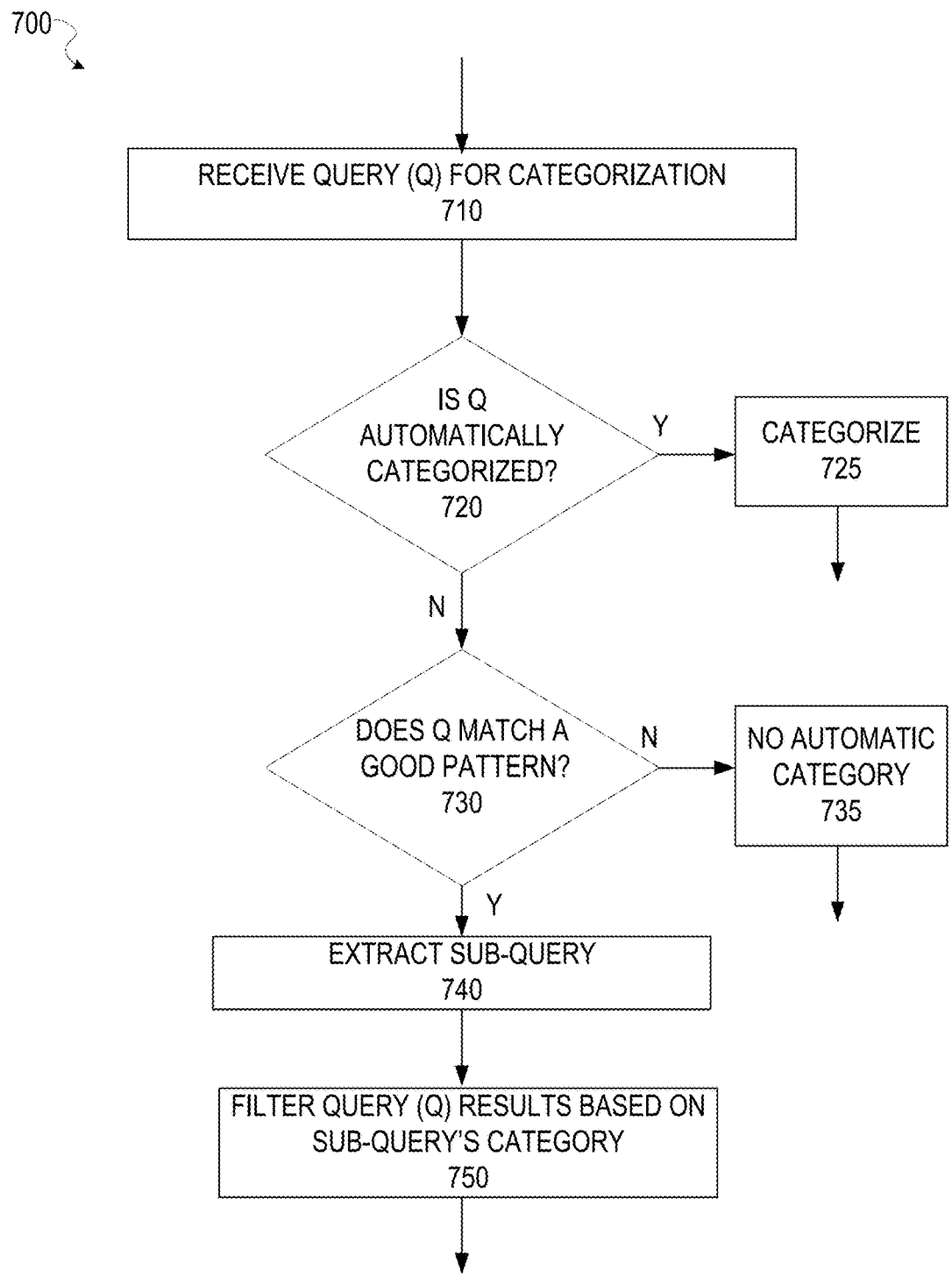
FIG. 7 is a flowchart of a method of automatic query categorization.

FIG. 7 is a flowchart of a method of automatic query categorization. In some aspects, one or more of the functions discussed below with respect to FIG. 7 may be performed by one or more hardware processors. For example, in some aspects, instructions 1408 (discussed below) stored in a hardware memory 1410 (discussed below) may configure the one or more hardware processors (1406 discussed below) to perform the one or more functions discussed below with respect to FIG. 7. In some aspects, instructions in the query categorizer 1345 may configure one or more hardware processors 1406 to perform one or more of the functions discussed below with respect to FIG. 7.

In block 710, a query (Q) is received for categorization. In some aspects, the query (Q) may be received from a network. For example, the query may be entered via a web based user interface, and transmitted to a web application via a computer network such as the internet. In some other aspects, the query may be entered into a mobile application, such as a mobile application running on an Apple iphone or Android device. The mobile application may transmit the query at least partially over a wireless network to a web application, such as the query classifier 845 discussed below. The query may include a plurality of words and/or tokens. The words or tokens may be provided in a particular sequence in the query. Words may be grouped into different combinations to form portions of the query. In some cases, the grouped words may form sub-queries. The sub-queries may, in some aspects, form queries 302 of the automatic categorization database 300, discussed above with respect to FIG. 3.

Decision block 720 determines whether the query is included in a list of queries that may be automatically categorized. In some aspects of block 720, the query is considered for automatic categorization as a complete unit. In other words, all words and/or tokens of the query are compared against a preexisting list of queries that may be automatically categorized. In some aspects, block 720 may compare portions of Q, such as groups of words or tokens discussed above, to a set of queries stored in the automatic categorization database 300, which stores a mapping of queries 302 to automatic categories 304 for the queries 302, as described above. If the query (e.g. as a whole) is subject to automatic categorization, process 700 moves to block 725, and the query is automatically categorized. In some aspects, block 725 includes filtering a set of search results for the query to those results meeting the automatic category associated with the query Q. For example, in some aspects, the search results may be filtered to include only those results matching the category 304 in the automatic categorization database 300. Some aspects of block 725 may include transmitting the categorized search results over a network to be displayed as search results for the query Q. In some aspects, the results may be presented in a web user interface or in an interface of a thick client application, such as a mobile application running on, for example, an iPhone® or Android® device.

If decision block 720 determines the query Q does not qualify for automatic categorization as a whole, process 700 moves to decision block 730, which determines whether the query Q includes a pattern that is subject to automatic categorization. For example, in some aspects, block 720 may determine if query Q matches a pattern stored in the pattern database 390. In some aspects, block 720 may determine whether any patterns in the pattern database 390 with a score meeting a criteria match the query. If a match is not found, process 700 moves to block 735, where no automatic categorization of the query is performed. In some aspects, search results for the query may not be filtered to a specific category, and multiple categorizes of search results may be provide in a list of query results. As discussed above with respect to block 725, these results may be transmitted over a computer network for display in either a web based interface or thick client application.

If a pattern match is found, process 700 moves to block 740, which extracts the sub-query from the query based on the pattern. For example, if the query is "rose gold iphone case," and the pattern is "rose gold <query>," then block 740 extracts "iphone case" from the query Q.

In block 750, results of the query Q are filtered based on a category for the extracted sub-query. For example, the query "rose gold iphone case" may be categorized according to the extracted query "iphone case." In some aspects, the automatic categorization database 300 may be utilized by block 750 to determine the category. For example, the automatic categorization database 300 may store a category for the query 302 "iphone case" as "iphone cases" in some aspects. A set of query results for the query "rose gold iphone case" may then be filtered to include only those results within the "iphone cases" category.

Figure 8:
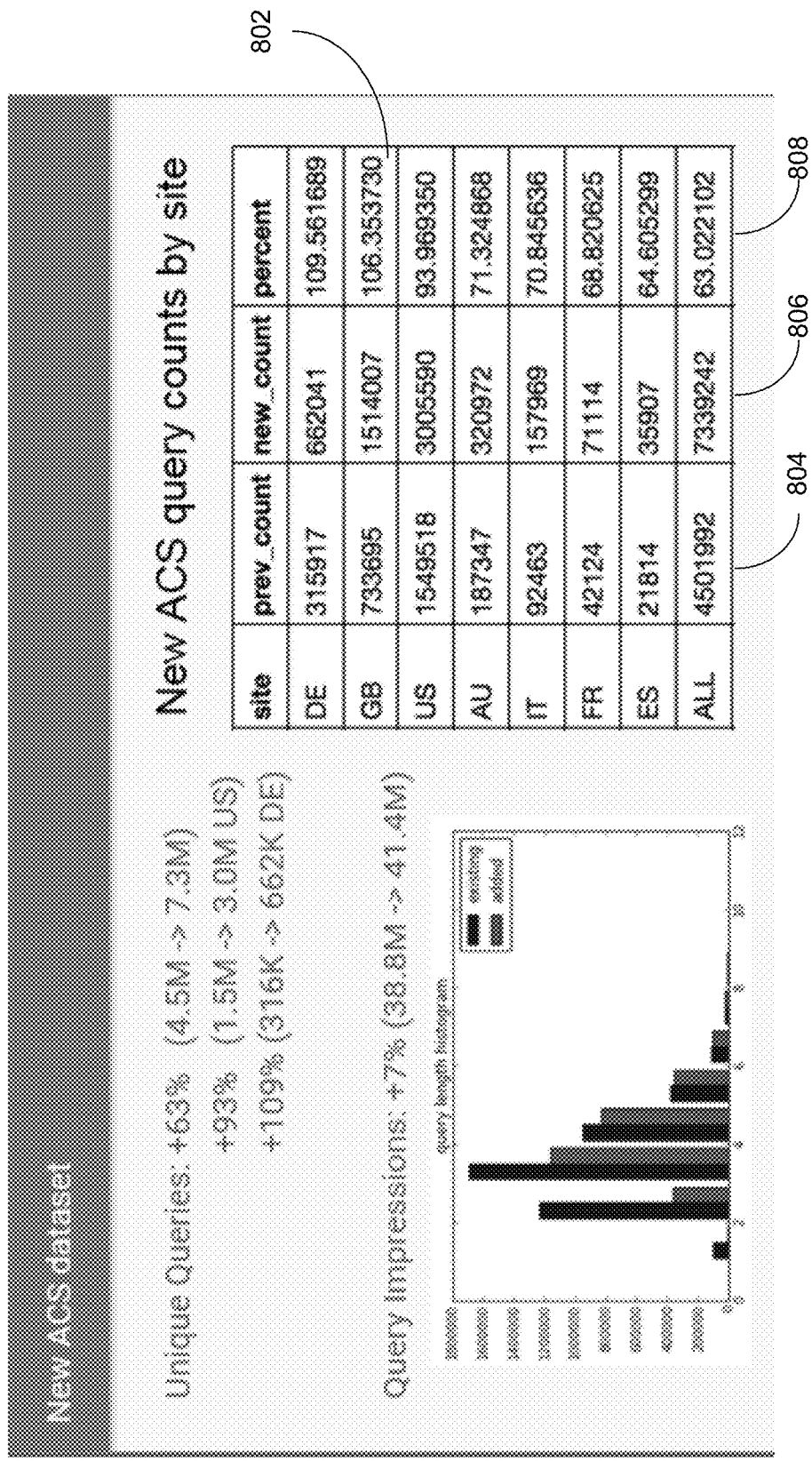
FIG. 8 shows exemplary results of the automatic categorization enhancement processes described above

FIG. 8 shows exemplary results of the automatic categorization enhancement processes described above. FIG. 8 shows a table 802 showing a previous number of automatic categories 804 for various regions, an enhanced number 806 of automatic categories after the methods disclosed above were applied for the various regions, and a resulting percentage increase 806 for the various regions.

As shown in FIG. 8, the number of queries qualifying for automatic categorization increased by between sixty three (63) and 109 percent by applying the methods disclosed above. This increase provides an improved user experience, and higher revenue for an operator of a query response system implementing these methods.

Figure 9:
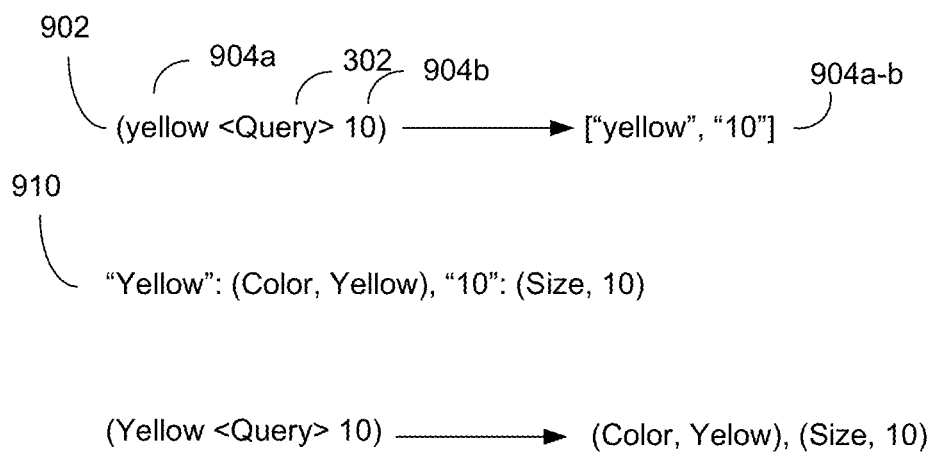
FIG. 9 shows a query including a pattern.

Once a query response system is enhanced with an ability to identify both a core component of a query and an ancillary component of a query, such as core component (query) 230a and ancillary component 230b discussed above with respect to FIG. 2B, additional benefits may be derived by further analysis of the ancillary portion 230b. FIG. 9 demonstrates at a high level how attributes may be identified in the ancillary portion 230b, further enhancing a query response system's ability to limit or filter query results to those of particular interest to a user submitting the query.

FIG. 9 shows a query 902 including a pattern as discussed above. The query 902 includes a query 302, along with the tokens "yellow" 904a and "10" 904b. The disclosed methods and systems may identify each of these additional tokens 904a-b or words as shown.

The disclosed methods and systems may then map zero or more of the additional tokens 904a and 904b in the query 902 to structured data. For example, FIG. 9 shows that a first token "yellow" 904a has been mapped to a color attribute 130, which has a value "yellow" matching the first token 904a. The second token "10" 904b has been mapped to a size attribute 130, which has a possible value of "10" matching the second token 904b. Informal results 910 of this process are shown in FIG. 9. FIG. 9 shows that the additional attributes identified in the query 902 may be utilized to further limit results of the query 902. For example, in the example shown in FIG. 9, the results may be limited to items 396 that have a category equivalent to that for the query 302, and having attributes of yellow color and size 10.

Figure 10:
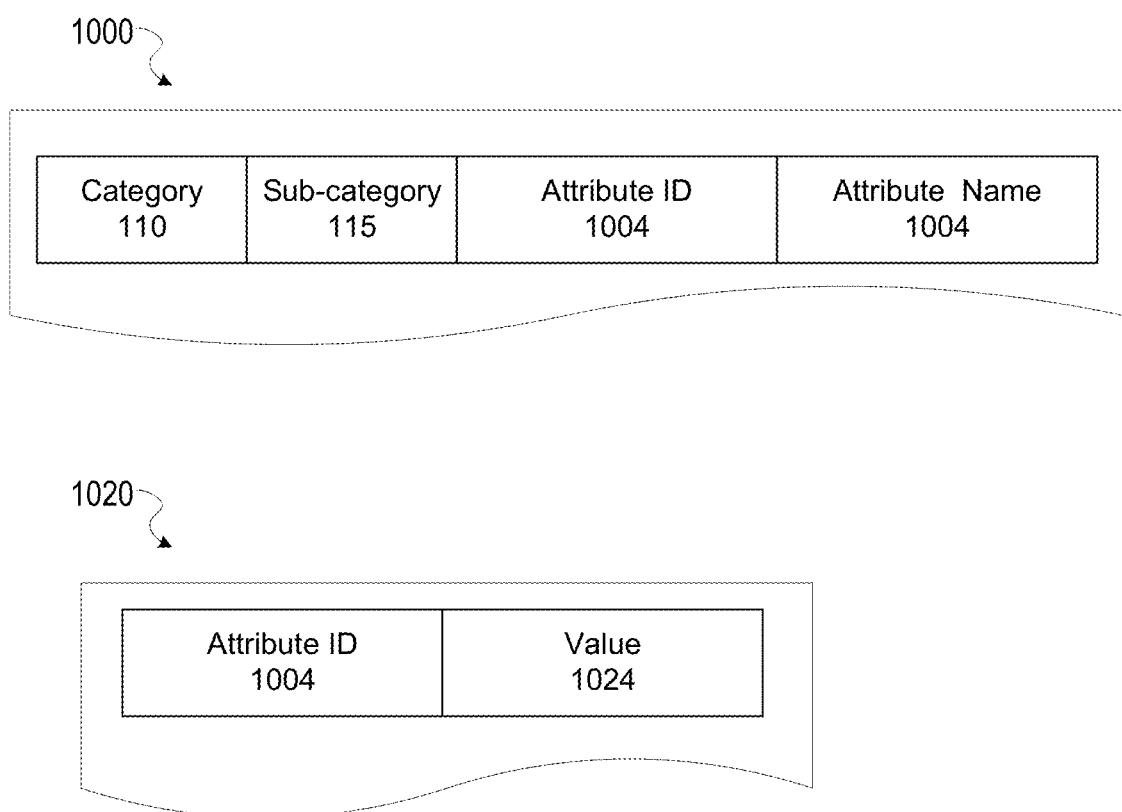
FIG. 10 illustrates exemplary database tables that may be utilized in some aspects to implement enhanced attribute identification as described above with respect to FIG. 9.

FIG. 10 illustrates exemplary database tables that may be utilized in some aspects to implement enhanced attribute identification as described above with respect to FIG. 9. FIG. 10 illustrates as attribute database 1000, an attribute value database 1020. The attribute database 1000 includes a category column 1002, attribute id 1004, and attribute friendly name 1104.

The attribute value database 1020 includes an attribute identifier 1104 and a possible value for the attribute identified via the attribute identifier 1004. In some embodiments, there may be multiple entries in the attribute value database 1020 for the same attribute id 1004 if the attribute may have one of multiple enumerated values (e.g. color). In some aspects, the value column 1024 may indicate a numeric range of values for the attribute 1004.

Figure 11:
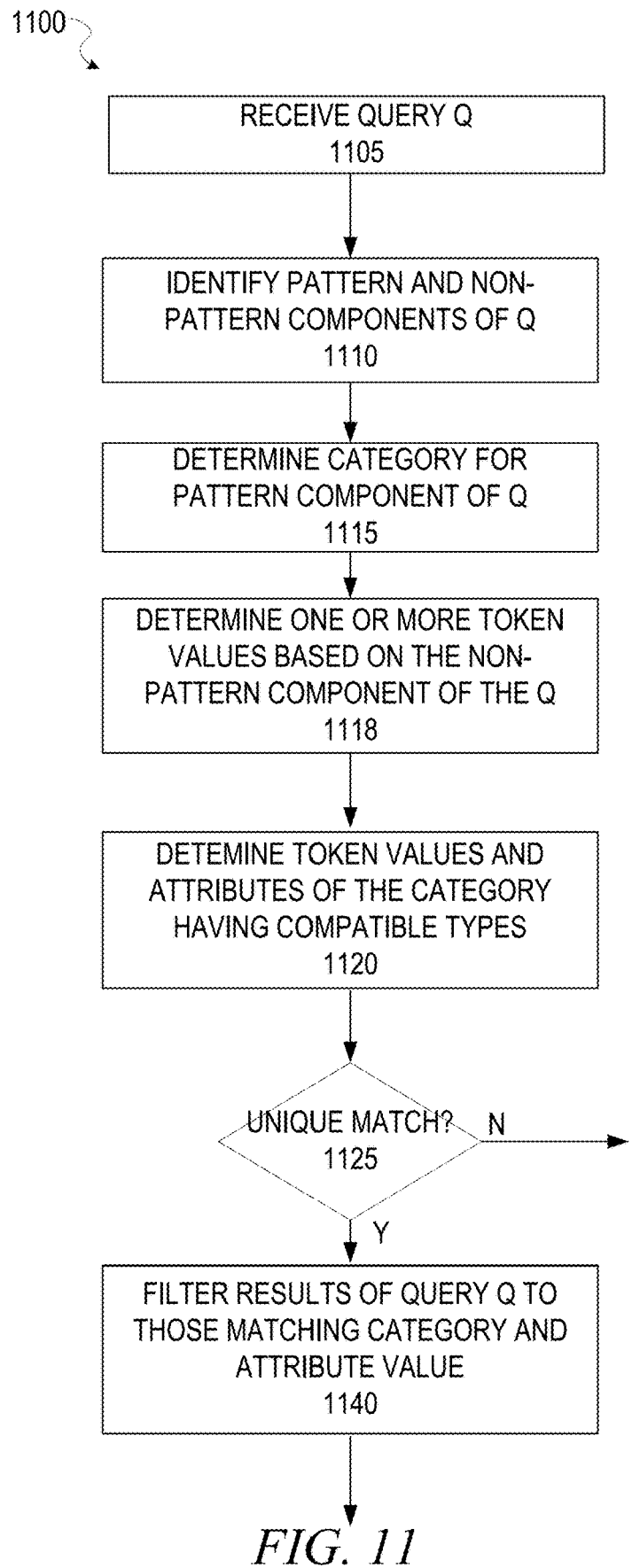
FIG. 11 is a flowchart of a method for identifying attributes within a query.

FIG. 11 is a flowchart of a method for identifying attributes within a query. One benefit of identifying patterns within a query as discussed herein, is that it provides a mechanism to separate core and ancillary portions of the query. The core portion of the query may be indicative of a category of items an issuer of a query seeks. The core portion of the query may be the portion substituted for the predetermined string, for example, as discussed above with respect to block 408 of FIG. 8. The core portion may be a portion of the query matching a query in an automatic categorization database.

Ancillary portions of the query may be non-core portions. The ancillary portions of the query may be indicative of other attributes of the items (non-category), such as a color, size, or particular brand of the item. Each category of items may have a unique set of attributes that apply to items of that category. For example, as discussed above with respect to FIG. 1, attributes for computers may be different than attributes for automotive parts. Process 1100 described below identifies values for these attributes by analyzing ancillary, non-core portions of the query for indications of the attribute values. By providing results to a user that are filtered not only by an appropriate category, but also to those items matching attributes specified by the user in a query, user satisfaction is improved, and revenue for a query response system implementing these techniques may be enhanced.

In some aspects, one or more of the functions discussed below with respect to FIG. 11 may be performed by one or more hardware processors. For example, in some aspects, instructions 1408 (discussed below) stored in a hardware memory 1410 (discussed below) may configure the one or more hardware processors (1406 discussed below) to perform the one or more functions discussed below with respect to FIG. 11. In some aspects, instructions in the query categorizer 1345 may configure one or more hardware processors 1406 to perform one or more of the functions discussed below with respect to FIG. 11.

In block 1105, a query is received. As discussed above, the query may be received from a network. For example, a query may be entered into a web based interface, and transmitted over a network to a server or set of servers. One of the servers may receive the query in block 1105. Alternatively, the query may be entered into a thick client application. For example, a Microsoft windows application, or an application running on a mobile device, such as an iPhone or Android device. The thick application may then transmit a network message including the query to a web application.

In block 1110, pattern and non-pattern components of the query are identified. Block 1110 may operate in a similar manner to portions of process 400 discussed above. For example, block 1110 may include one or more functions described with respect to blocks 404, 406, 408, and 414. In other words, in some aspects, block 1110 may search the automatic categorization database 300 for a query 302 included within the query received in block 1105. The query 302 portion may be the pattern component, with a remaining portion of the query received in block 1105 being the non-pattern component. With respect to FIG. 2B, query portion 230a may be considered an example of a pattern component and query portion 230b may be considered an example non-pattern component.

Block 1115 determines a category for the pattern component. In some aspects, the category may be determined by consulting a data store mapping queries to categories. For example, block 1115 may, in some aspects, search the automatic categorization database 300 for the query 302 equivalent to the pattern component. Block 1115 then determines the category for the pattern component as the corresponding category 304 for the query 302 in these aspects.

Block 1118 determines one or more token values based on the non-pattern component of the query. For example, in some aspects, block 1118 may scan the ancillary or non-pattern component of the query to determine tokens present in the non-pattern component. Values for those tokens may then be determined. As one example, if the query is "rose gold iphone case," the pattern component may be "iphone case" as this portion may match a query in an automatic categorization database. Non-core or non-pattern components of the query may include "rose gold." Thus, the values block 1118 may determine in this case are "rose" and "gold."

Block 1120 then determines whether any tokens included in the non-pattern component match attribute values for the category determined in block 1115. For example, in some aspects, block 1120 may search the attribute database 1000 for the category determined in block 1115. In some example embodiments, one or more of the category 110 and subcategory 115 columns of the database 1000 may be searched. One or more tokens in the query may or may not match one or more attribute name values 1004 for the category of block 1115. Possible values 1024 for the identified attributes 1004 may be determined by consulting the attribute value database 1020. In some aspects, block 1120 may determine whether any tokens included in the non-pattern component are of a type that is compatible with a type of an attribute for the category. For example, a color attribute may allow values corresponding to a finite set of strings, such as "red," "blue," etc. Block 1120 may determine whether the attribute value provided by the query is compatible with possible values of a category attribute.

Decision block 1125 determines whether any tokens within the query are a unique match for an attribute value for the category. For example, a token of "gold" may only match a value of a color attribute. In contrast, an attribute value of "10" may, in some aspects, may be an acceptable value for multiple attributes. If the match is unique, process 1100 moves to block 1140, which filters results of the query Q to those matching the category and the attribute value identified in block 1120. After the results are filtered, they may be transmitted over a network to a web-interface or thick client application, as discussed above.

Figure 12:
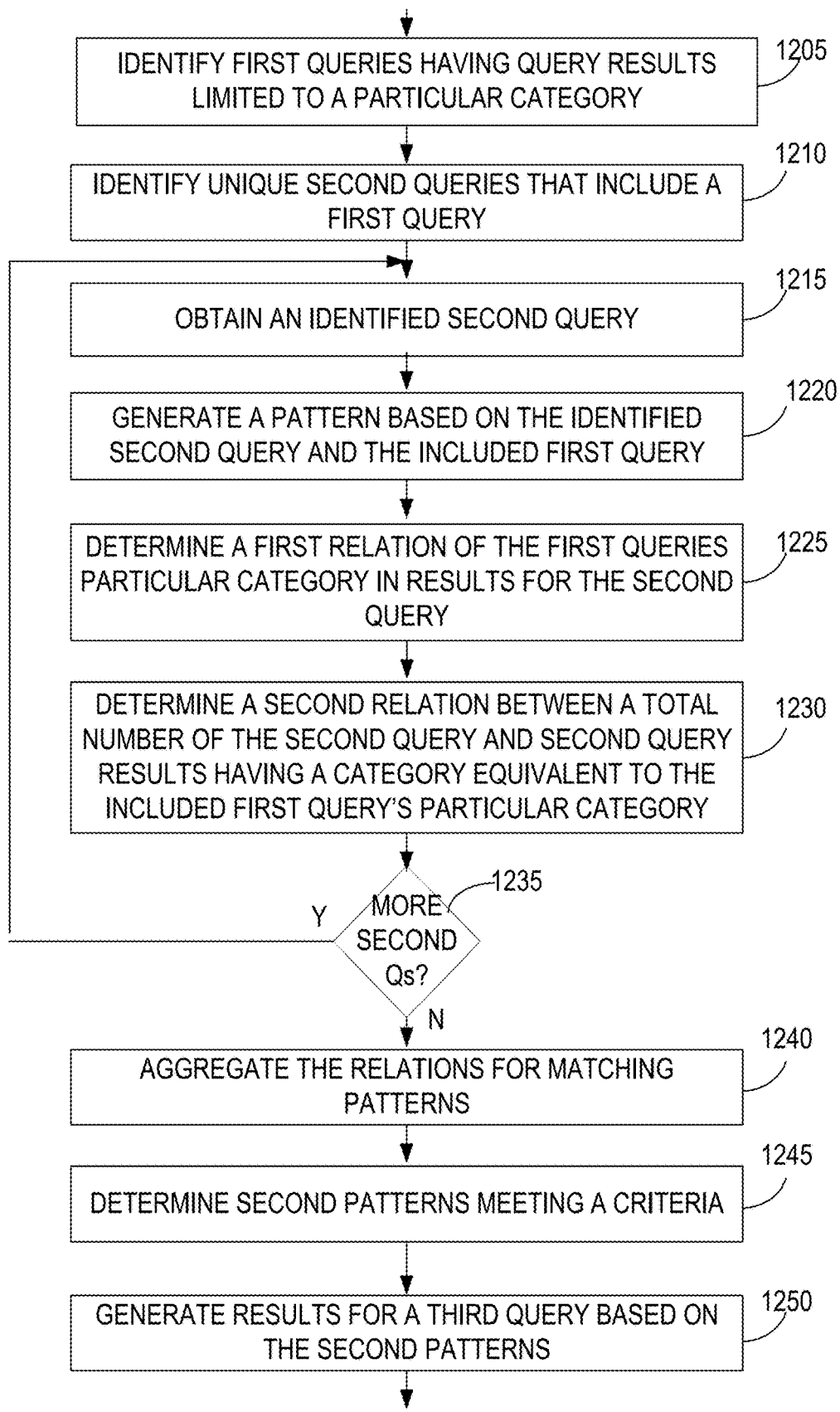
FIG. 12 is a flowchart of a method of improving results for a query.

FIG. 12 is a flowchart of a method of improving results for a query. In some aspects, process 1200, discussed below with respect to FIG. 12, identifies portions of a query that reveal a query issuer's intent with respect to a category of items of interest. Some portions of the query are directed to that intent, while other portions of the query may not be indicative of that intent, at least with respect to a category of goods. Thus, results of the query may be categorized based on the determined intent, while non-intent modifying portions may not be used for categorizing results of the query.

One or more of the functions discussed below with respect to FIG. 12 may be performed by one or more electronic hardware processors. For example, as discussed below with respect to FIGS. 13-15, in some aspects, instructions included in the query categorizer 1345, such as instructions 1408 may configure one or more processing units 1406 to perform the functions discussed below with respect to FIG. 12. In some aspects, process 1200 may include, or work in conjunction with, one or more of the functions of any of the processes 400, 500, 600, 700, or 1100, discussed above with respect to FIG. 4, 5, 6, 7, or 11 respectively.

In block 1205, one or more first queries are identified. Each of the first queries are designated as having results that are limited to a particular category. For example, as discussed above, in some aspects, an automatic categorization database may store queries 302 that can be automatically categorized as a particular category 304. The query may be performed on an item database, such as item database 395 shown above in FIG. 3. The item database may map individual items 396 to corresponding categories 399. When a query (such as a first query) is "categorized," results of the query from the item database 395 may be filtered to include only those results within the query's category.

In block 1210, unique second queries are identified that include the first query. In some aspects, the second queries of block 1210 may be read from a historical query database, an example of which is shown in FIG. 3 as historical query database 330. The historical query database maps previous queries 332 to indications of categories selected from results of those queries. As discussed above, a query response system may record selection of query results, and note the categories of items selected. From this information, an inference may be made between the query and the types of categories 334 typically intended by the query. As shown in FIG. 3, the historical query database maps these historical categories 332 to the categories 334 selected from the query's 332 results. Because the historical query database 330 includes a running list of previously entered queries in some aspects, some of the queries 332 may be repeated. Thus, block 1210 identifies these duplicate queries to focus on unique queries in the historical query database. This enables proper determination of the query statistics discussed below.

Blocks 1215-1235 iterate through the unique second queries identified in block 1210. For example, block 1215 identifies one of the identified second queries. In block 1220, a pattern is generated based on the second query and the first query that is included in the second query. In some aspects, the first query include in the second query is substituted with a predetermined string or placeholder, to facilitate matching of patterns discussed below. For example, if a first query is "iphone case," and a second query is "rose gold iphone case," then the pattern may be "rose gold <Query>" with the string "<Query>" as the predetermined string or placeholder. The specific placeholder string used is not particularly important, and aspects may vary in this regard without departing from the spirit of the disclosed methods and systems. The placeholder portion of a pattern may represent a portion of the query indicating an intent of a query issuer. Other portions or ancillary portions may not effect that intent.

In block 1225, a first relation is determined between the (included in the second query) first queries (e.g. 302) particular category (e.g. 304) and category results (e.g. 334) for the second query (e.g. 332). In some aspects, the first relation may be an ordinary rank of the particular category in the results. For example, in some aspects, block 1220 may determine the number of unique categories that were indicated for the unique query in the historical query database. A count of the number of results within each unique category may then be determined. Block 1220 may then rank each unique category by their respective counts. In some aspects, block 1220 determines where the first queries particular category lies in this ranking. In some aspects, other first relations may be determined. For example, in some aspects, block 1220 may determine a percentage of results for the second query that were equivalent to the first query's particular category.

In block 1230, a second relation is determined between a total number of the unique second query (e.g. unique 332 in the historical query database 330) and results (e.g. 334) having a category equivalent to the included first query's (e.g. 302) particular category (e.g. 304). In some aspects, block 1230 determines a percentage of the results of the second query (e.g. 334) that match the particular category of the first query (e.g. 304) included in the second query (e.g. 332).

If there are additional unique second queries in the historical query database, decision block 1235 transfers processing back to block 1215, where the additional unique second queries are processed as described above. Process 400, discussed above with respect to FIG. 4, describes one exemplary embodiment of determining the relations of blocks 1225 and/or 1230.

Otherwise, block 1240 aggregates the relations determined in blocks 1225 and 1240 across matching patterns generated in block 1220. Thus, for example, if one unique second query is "rose gold iphone case" and another is "rose gold corvette," then these two second queries may result in patterns such as "rose gold <query>" and "rose gold <query" respectively. This example assumes first queries including "iphone case" and "corvette." These two patterns would be matched in block 1240, and the relations determined in blocks 1220 and 1230 separately aggregated. In some aspects, aggregating includes averaging or determining a median value. In some aspects but not all, averaging may be a weighted average.

Block 1245 determines second patterns meeting a criterion based on aggregated relations determined in block 1240. For example, in some aspects, patterns having fewer occurrences than a minimum threshold may be excluded from the second patterns. For example, if the number of patterns equivalent to "rose gold <query>" generated in block 1220 is below a threshold, this pattern may be excluded from the second patterns.

In some aspects, block 1245 may determine of the matching patterns ranked first with respect to the relation determined in block 1225. If a pattern's results (e.g. 334) were in agreement with the embedded first query's (e.g. 302) results (e.g. 304) above a threshold percentage of occurrences, then the pattern may be included in the second patterns.

In block 1250, results for a third query are determined based on the second patterns. In some aspects, the third query may be run against an item database, such as item database 390. Block 1250 may determine whether the third query is included in an automatic categorization database, such as automatic categorization database 300, discussed above with respect to FIG. 3. If the third query is present (e.g. equivalent to a query 302), the results of the third query from the item database (e.g. 390) may be filtered to include only those results having the automatic category (e.g. 304 of third query=column 399 of results) defined by the automatic categorization database (e.g. 300).

Otherwise, block 1250 may determine if the third query matches any of the second patterns. As discussed above, a pattern may be comprised of a generic placeholder such as "<query>" along with other ancillary terms. The placeholder portion of a second pattern may indicate a true intent of a query issuer with respect to a category of results sought. The ancillary portion of the pattern may not effect that intent. A query matches a pattern when the pattern and query share ancillary portions, and the query includes a sub-query, aligned with the placeholder in the pattern, and included in an automatic categorization database (e.g. 300). For example, if the third query is "rose gold iphone case," and a pattern in the second patterns is "rose gold <query>", block 1250 may identify that <query> in the pattern matches a sub-query f "iphone case" in the third query, and a remaining portion of the pattern "rose gold" also matches remaining portions of the third query. A search of an automatic categorization database may then be performed to determine whether the sub-query within the third query, ("iphone case") which is aligned with the placeholder (e.g. "<query>"), is equivalent to a query 302 subject to automatic categorization (e.g. via 304). If a match is found, the sub-query of the third query may indicate the true intent of a query issuer with respect to a category of results sought by the third query.

If the sub-query is found in the automatic categorization database, results of the third query from the item database (e.g. 390) are filtered to include only results having a category (e.g. 399) equivalent to the category (e.g. 304) for the sub-query (e.g. 302). In these aspects, other portions, such as ancillary portions (e.g. "rose gold") of the third query may be ignored when determining a category of results to return in response to the third query. For example, in the above example, "rose gold" is an ancillary portion of the query, and thus may be ignored when determining the category of results to provide. Instead, non-intent or ancillary portions of the query may be utilized to determine attributes of items within the determined category. This is described above with respect to FIG. 11.

Some aspects of block 1250 include transmitting the limited or filtered results over a computer network to a client device. For example, a client device 1310 (discussed below) may issue a third query, and transmit the third query over a computer network to a web application, such as the query categorizer 1345 discussed below. After the processing described above is applied to the third query, the results may be returned to the client device 1310.

Some aspects of process 1200 include process 1100, which determines attributes for items in an item database (e.g. 390). For example, in some aspects, block 1250 may include determining an attribute value for the category (e.g. 304) of the first query (e.g 302) included in the third query, and limiting the results of the third query to items having the determined attribute value. In some aspects, determining the attribute value may include determining an ancillary token based on the third query and the first query included in the third query, determining one or more attributes associated with the category of the third query, determine attribute values for the determined attributes, determine a token values based on the ancillary token and assign the token value to the attribute value in response to the values being of a compatible type.

Figure 13:
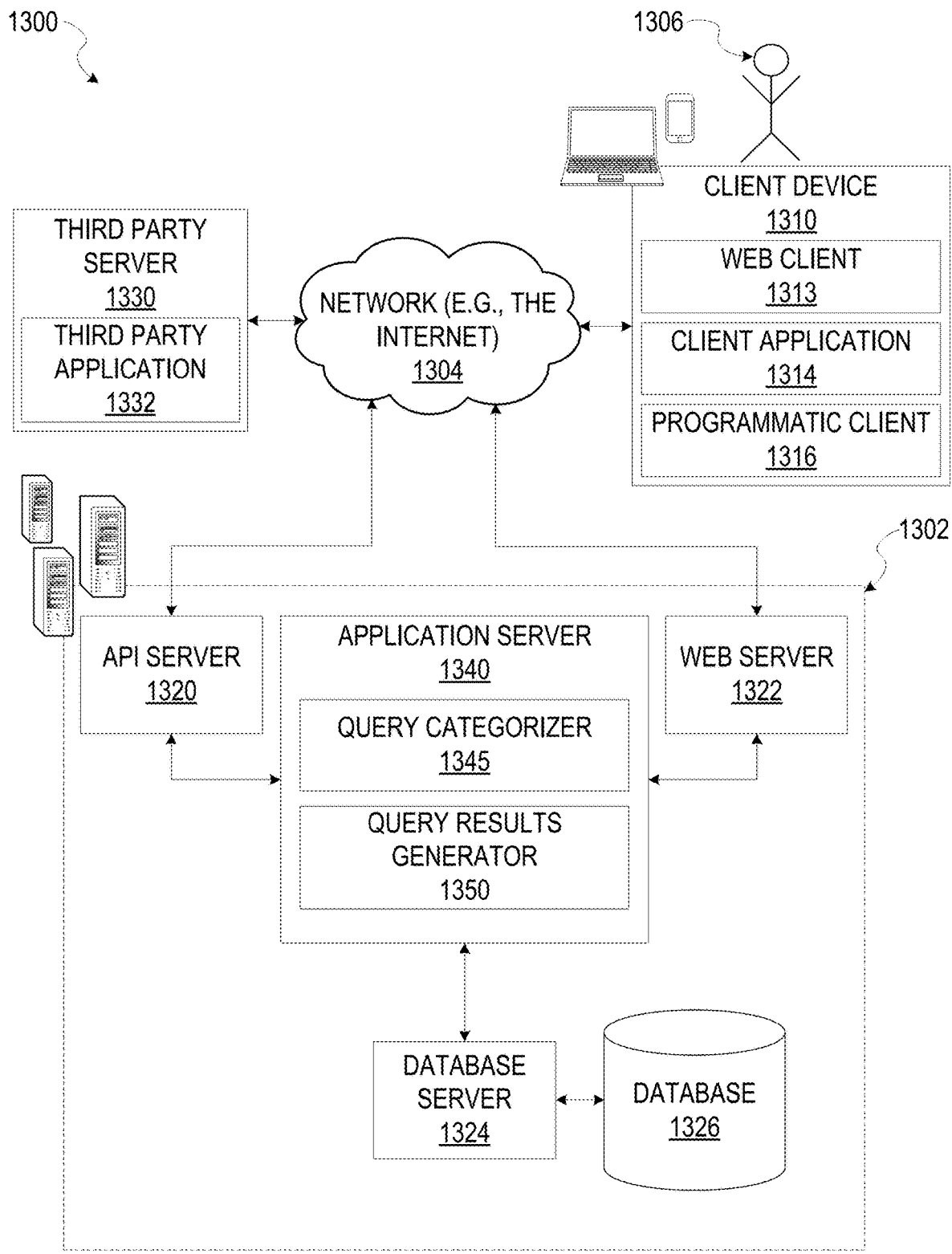
FIG. 13 is a block diagram of an exemplary client-server-based architecture.

FIG. 13 is a block diagram of an exemplary client-server-based architecture 1300 for a query response system. While FIG. 13 depicts the client-server-based architecture 1300, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 13. Moreover, it shall be appreciated that although the various functional components illustrated in FIG. 13 are discussed in a singular sense, multiple instances of any one of the various functional components may be employed.

A content publication platform 1302, in the example form of a network-based system, provides server-side functionality via a network 1304 (e.g., the Internet or wide area network (WAN)) to one or more client devices 1310. FIG. 13 illustrates, for example, a web client 1312 (e.g., a browser), a client application 1314, and a programmatic client 1316 executing on the client device 1310. The client device 1310 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the content publication platform 1302. In some embodiments, the client device 1310 may comprise a display module (not shown) to display information (e.g., in the form of user interfaces). In further embodiments, the client device 1310 may comprise one or more of a touch screens, accelerometers, gyroscopes, cameras, microphones, global positioning system (GPS) devices, and so forth. In one embodiment, the content publication platform 1302 is a network-based marketplace that publishes publications (e.g., web documents) comprising item listings of products available on the network-based marketplace.

One or more users 1306 may be a person, a machine, or other means of interacting with client device 1310. In example embodiments, the user 1306 is not part of the client-server-based architecture 1300, but may interact with the client-server-based architecture 1300 via the client device 1310 or another means. For example, the user 1306 may provide input (e.g., touch screen input or alphanumeric input) to the client device 1310, and the input is communicated to the content publication platform 1302 via a network 1304. In this instance, the content publication platform 1302, in response to receiving the input from the user 1306, communicates information to the client device 1310 via the network 1304 to be presented to the user 1306. In this way, the user 1306 can interact with the content publication platform 1302 using the client device 1310.

The client device 1310 may include one or more client applications 1314 (also referred to as "apps") such as, but not limited to, a web browser, messaging application, electronic mail (email) application, an e-commerce site application (also referred to as a marketplace application), and the like. In some embodiments, if the e-commerce site application is included in the client device 1310, then this application is configured to locally provide the user interface and at least some of the functionalities with the client application 1314 configured to communicate with the content publication platform 1302, on an as needed basis, for data or processing capabilities not locally available (e.g., access to a database of items available for sale, to authenticate the user 1306, to verify a method of payment, etc.). Conversely if the e-commerce site application is not included in the client device 1310, the client device 1310 may use its web browser to access the e-commerce site (or a variant thereof) hosted on the content publication platform 102.

One or more portions of network 1304 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

An application program interface (API) server 1320 and a web server 1322 are coupled to, and provide programmatic and web interfaces respectively to an application server 1340. The application server 1340 may host a query categorizer 1345 and a query results generator 1350, and each of which may be embodied as hardware, software, firmware, or any combination thereof. In some aspects, instructions included in the query categorizer 1345 may configure the application server 1340 to perform one or more of the functions described above with respect to any of FIGS. 4-7, and/or 9-12. The query results generator 1350 may receive results of queries from the query categorizer 1345 according to the disclosed embodiments. The application server 1340 is, in turn, shown to be coupled to a database server 1324 that facilitate access to database 1326. In an example embodiment, the database 1326 is a storage devices that stores information to be returned as results (e.g., publications or listings) to the query categorizer 1345. The databases 1326 may also store digital item information in accordance with example embodiments. For example, the databases 1326 may store one or more of the databases and/or tables discussed above with respect to one or more of FIGS. 3 and/or 10.

Additionally, a third party application 1332, executing on a third party server 1330, is shown as having programmatic access to the content publication platform 1302 via the programmatic interface provided by the API server 1320. For example, the third party application 1332, utilizing information retrieved from the content publication platform 1302, supports one or more features or functions on a website hosted by the third party.

While the query classifier 1335 and database search process 1323 are shown in FIG. 13 to both form part of the query platform 1302, it will be appreciated that, in alternative embodiments, each of the query classifier 235 and database search process 1323 may form part of a service or platform that is separate and distinct from the content query platform 1302.

Figure 14:
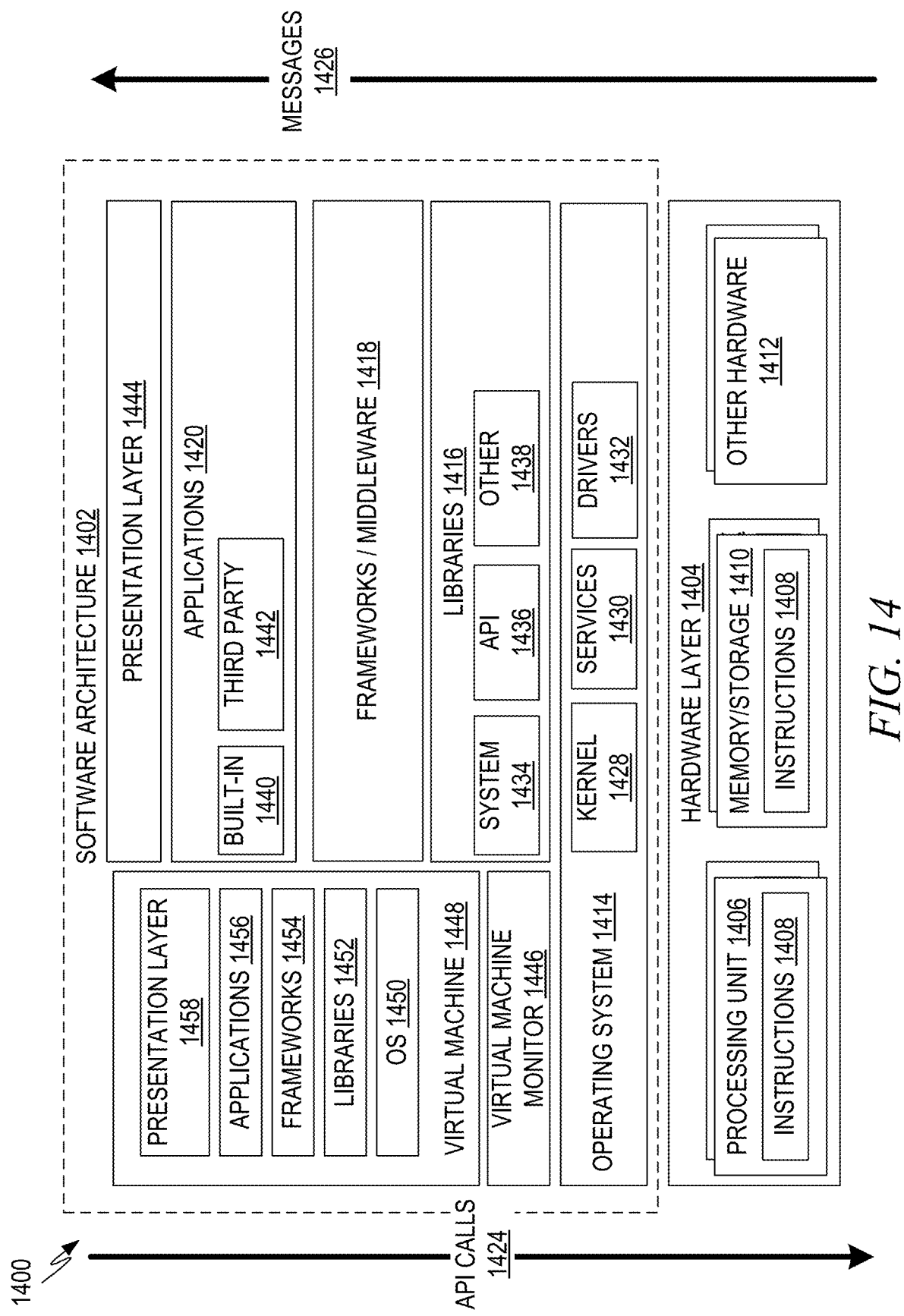
FIG. 14 is a block diagram illustrating a representative software architecture, which may be used in conjunction with various hardware architectures herein described.

FIG. 14 is a block diagram 1400 illustrating a representative software architecture 1402, which may be used in conjunction with various hardware architectures herein described. FIG. 14 is merely a non-limiting example of a software architecture and it will be appreciated that many other architectures may be implemented to facilitate the functionality described herein. The software architecture 1402 may be executing on hardware such as machine 600 of FIG. 6 that includes, among other things, processors 610, memory 630, and I/O components 650. A representative hardware layer 1404 is illustrated and can represent, for example, the machine 600 of FIG. 6. The representative hardware layer 1404 comprises one or more processing units 1406 having associated executable instructions 1408. Executable instructions 1408 represent the executable instructions of the software architecture 1402, including implementation of the methodologies and modules and so forth described above. Hardware layer 1404 also includes memory and/or storage modules 1410, which also have executable instructions 1408. Hardware layer 1404 may also comprise other hardware as indicated by 1412 which represents any other hardware of the hardware layer 1304, such as the other hardware illustrated as part of machine 1500.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420 and presentation layer 1444. Operationally, the applications 1420 and/or other components within the layers may invoke application programming interface (API) calls 1424 through the software stack and receive a response, returned values, and so forth illustrated as messages 1426 in response to the API calls 1424. The layers illustrated are representative in nature and not all software architectures have all layers. For example, some mobile or special purpose operating systems may not provide a frameworks/middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), WiFi® drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430, and/or drivers 1432). The libraries 1416 may include system 1434 libraries (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks/middleware 1418 (also sometimes referred to as middleware) may provide a higher-level common infrastructure that may be utilized by the applications 1420 and/or other software components/modules. For example, the frameworks 1418 may provide various graphic user interface (GUI) functions, high-level resource management, high-level location services, and so forth. The frameworks 1418 may provide a broad spectrum of other APIs that may be utilized by the applications 1420 and/or other software components/modules, some of which may be specific to a particular operating system or platform.

The applications 1420 includes built-in applications 1440 and/or third party applications 1442. Examples of representative built-in applications 1440 may include, but are not limited to, a contacts application, a browser application, a book reader application, a location application, a media application, a messaging application, and/or a game application. Third party applications 1442 may include any of the built in applications as well as a broad assortment of other applications. In a specific example, the third party application 1442 (e.g., an application developed using the Android™ or iOS™ software development kit (SDK) by an entity other than the vendor of the particular platform) may be mobile software running on a 'mobile operating system such as iOS™, Android™, Windows® Phone, or other mobile operating systems. In this example, the third party application 1442 may invoke the API calls 1424 provided by the mobile operating system such as operating system 1414 to facilitate functionality described herein.

The applications 1420 may utilize built in operating system functions (e.g., kernel 1428, services 1430 and/or drivers 1432), libraries (e.g., system 1434, APIs 1436, and other libraries 1438), frameworks/middleware 1418 to create user interfaces to interact with users of the system. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware machine (such as the machine of FIG. 14, for example). A virtual machine is hosted by a host operating system (operating system 1414 in FIG. 14) and typically, although not always, has a virtual machine monitor 1446, which manages the operation of the virtual machine as well as the interface with the host operating system (i.e., operating system 1414). A software architecture executes within the virtual machine such as an operating system 1450, libraries 1452, frameworks/middleware 1454, applications 1456 and/or presentation layer 1458. These layers of software architecture executing within the virtual machine 1448 can be the same as corresponding layers previously described or may be different.

Figure 15:
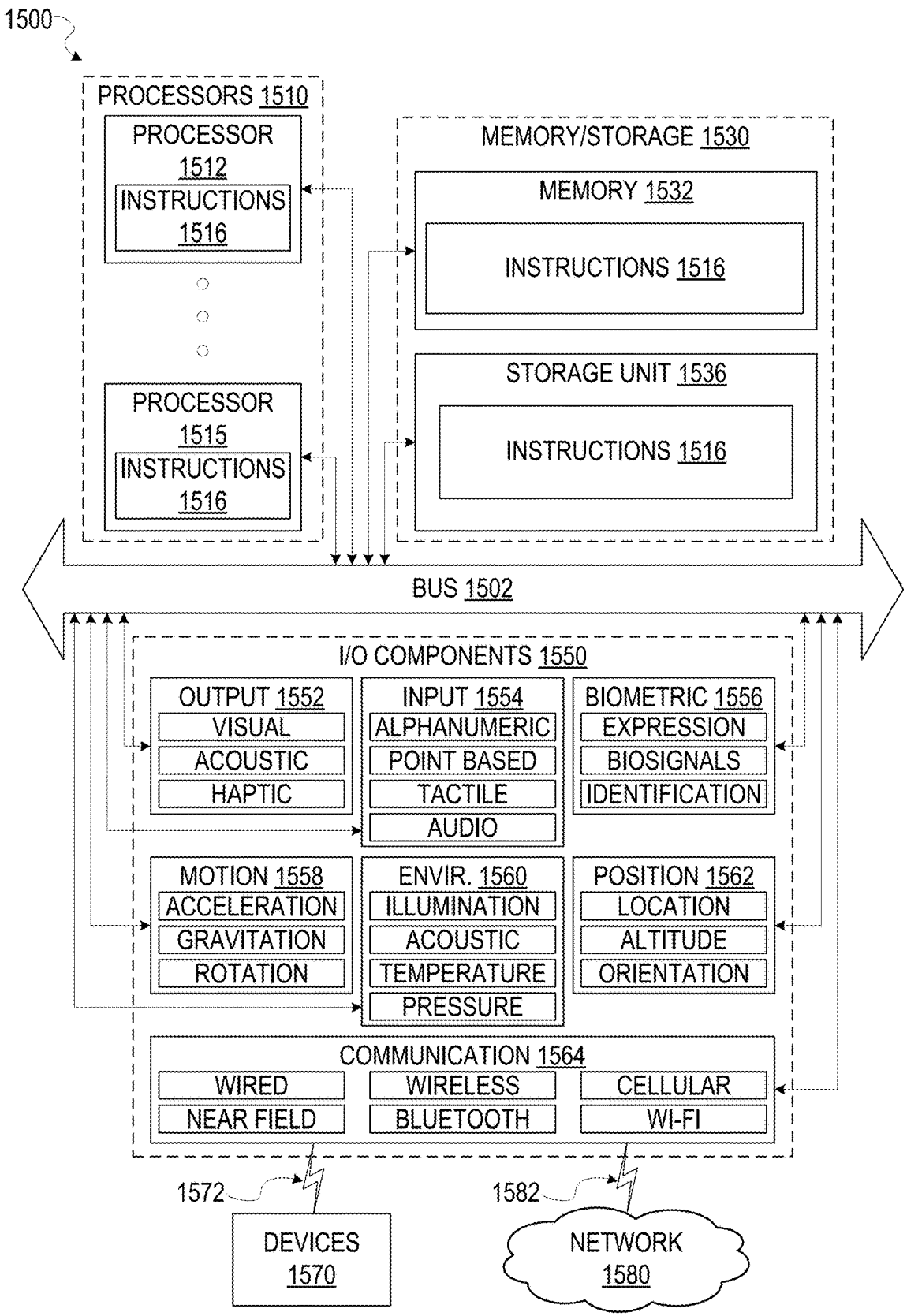
FIG. 15 is a block diagram illustrating components of an exemplary machine able to perform any one or more of the methodologies discussed herein.

FIG. 15 is a block diagram illustrating components of the machine 1500, according to some example embodiments, able to read instructions from a machine-readable medium (e.g., a machine-readable storage device) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. These instructions transform the general, non-programmed machine into a particular machine programmed to carry out the described and illustrated methodologies in the manner described herein. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. By way of non-limiting example, the machine 1500 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include a multi-core processor 1510 that may comprise two or more independent processors (sometimes referred to as "cores") that may execute instructions contemporaneously. Although FIG. 15 shows multiple processors, the machine 1500 may include a single processor with a single core, a single processor with multiple cores (e.g., a multi-core processor), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine (e.g., processors 1510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se. In example embodiments, a machine-readable medium may also be referred to as a "machine-readable storage device."

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion, and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572 respectively. For example, the communication components 1564 may include a network interface component or other suitable device to interface with the network 1580. In further examples, the communication components 1564 may include wired communication components, wireless communication components, cellular communication components, near field communication (NFC) components, Bluetooth® components (e.g., Bluetooth® Low Energy), WiFi® components, and other communication components to provide communication via other modalities. The devices 1570 may be another machine or any of a wide variety of peripheral devices (e.g., a peripheral device coupled via a Universal Serial Bus (USB)).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via WiFi® signal triangulation, location via detecting an NFC beacon signal that may indicate a particular location, and so forth.

In various example embodiments, one or more portions of the network 1580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WiFi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially hardware processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

I claim:

1. A method of query processing at an application server using query categorization, the method comprising:
   receiving, at the application server, a search query comprising at least a first text portion and a second text portion;
   determining the search query matches a pattern from a pattern database, the pattern having a fixed text portion and an uncategorized variable placeholder portion;
   in response to determining the search query matches the pattern, using the pattern to identify the first text portion in the search query as a sub-query based on the second text portion in the search query corresponding to the fixed text portion of the pattern and the first text portion in the search query corresponding to the uncategorized variable placeholder portion of the pattern;
   based on identifying the first text portion in the search query as the sub-query, categorizing the search query by assigning, to the search query, a category of the sub-query for performing a search with the search query using the category of the sub-query; and
   generating search results for the search query using the category of the sub-query.

2. The method of claim 1, wherein the pattern is identified and stored in the pattern database by:
   for each of a plurality of historical queries that are not categorized:
   identifying a portion of the historical query as corresponding to a categorized query from a plurality of categorized queries;
   generating the pattern by replacing the portion of the historical query corresponding to the categorized query with the uncategorized variable placeholder portion;
   comparing a category of search results for the historical query with a category of the categorized query; and
   selecting the pattern for storage in the pattern database based on comparison of the category of search results for each historical query with the category of the categorized query within each historical query.

3. The method of claim 2, wherein comparing the category of search results for a first historical query with the category of the categorized query within the first historical query comprises:
   determining a rank of the category of the categorized query in the search results for the first historical query.

4. The method of claim 2, wherein selecting the pattern for storage in the pattern database based on comparison of the category of search results for each historical query with the category of the categorized query within each historical query comprises:
   determining a percentage of the historical search queries in which the category of search results for the historical search queries matches the category of the categorized queries within the historical search queries.

5. The method of claim 2, wherein the categorized queries are identified based on a database mapping each categorized query to a corresponding category.

6. The method of claim 2, wherein the placeholder comprises a predetermined string.

7. The method of claim 1, wherein generating the search results for the search query comprises:
   determining an attribute value based on another portion of the search query; and
   identifying the search results using the attribute value and the category of the sub-query.

8. The method of claim 7, wherein determining the attribute value comprises:
   determining an ancillary token based on the search query and the sub-query included in the search query;
   determining one or more attributes associated with the category of the sub-query;
   determining attribute values for the one or more attributes;
   determining a token value based on the ancillary token; and
   assigning the token value to the attribute value in response to a comparison of the token value to attribute values for the one or more attributes.

9. One or more machine-readable media storing computer-useable instruction that, when used by one or more processor an application server, cause the one or more processors to perform operations, the operations comprising:
   receiving, at the application server, a search query comprising at least a first text portion and a second text portion;
   determining the search query matches a pattern from a pattern database, the pattern having a fixed text portion and an uncategorized variable placeholder portion;
   in response to determining the search query matches the pattern, using the pattern to identify the first text portion in the search query as a sub-query based on the second text portion in the search query corresponding to the fixed text portion of the pattern and the first text portion in the search query corresponding to the uncategorized variable placeholder portion of the pattern;
   based on identifying the first text portion in the search query as the sub-query, categorizing the search query by assigning, to the search query, a category of the sub-query for performing a search with the search query using the category of the sub-query; and generating search results for the search query using the category of the sub-query.

10. The one or more machine-readable media of claim 9, wherein the pattern is identified and stored in the pattern database by:
for each of a plurality of historical queries that are not categorized:
identifying a portion of the historical query as corresponding to a categorized query from a plurality of categorized queries;
generating the pattern by replacing the portion of the historical query corresponding to the categorized query with the uncategorized variable placeholder portion;
comparing a category of search results for the historical query with a category of the categorized query; and
selecting the pattern for storage in the pattern database based on comparison of the category of search results for each historical query with the category of the categorized query within each historical query.

11. The one or more machine-readable media of claim 10, wherein comparing the category of search results for a first historical query with the category of the categorized query within the first historical query comprises:
determining a rank of the category of the categorized query in the search results for the first historical query.

12. The one or more machine-readable media of claim 10, wherein selecting the pattern for storage in the pattern database based on comparison of the category of search results for each historical query with the category of the categorized query within each historical query comprises:
determining a percentage of the historical search queries in which the category of search results for the historical search queries matches the category of the categorized queries within the historical search queries.

13. The one or more machine-readable media of claim 10, wherein the categorized queries are identified based on a database mapping each categorized query to a corresponding category.

14. The one or more machine-readable media of claim 10, wherein the placeholder comprises a predetermined string.

15. The one or more machine-readable media of claim 9, wherein generating the search results for the search query comprises:
determining an attribute value based on another portion of the search query; and
identifying the search results using the attribute value and the category of the sub-query.

16. The one or more machine-readable media of claim 15, wherein determining the attribute value comprises:
determining an ancillary token based on the search query and the sub-query included in the search query;
determining one or more attributes associated with the category of the sub-query;
determining attribute values for the one or more attributes;
determining a token value based on the ancillary token; and
assigning the token value to the attribute value in response to a comparison of the token value to attribute values for the one or more attributes.

17. An application server comprising:
one or more processors; and
one or more computer readable storage media storing computer-useable instructions that, when used by the one or more processors, cause the one or more processors to:
receive, at the application server, a search query comprising at least a first text portion and a second text portion;
determine the search query matches a pattern from a pattern database, the pattern having a fixed text portion and an uncategorized variable placeholder portion;
in response to determining the search query matches the pattern, use the pattern to identify the first text portion in the search query as a sub-query based on the second text portion in the search query corresponding to the fixed text portion of the pattern and the first text portion in the search query corresponding to the uncategorized variable placeholder portion of the pattern;
based on identifying the first text portion in the search query as the sub-query, categorize the search query by assigning, to the search query, a category of the sub-query for performing a search with the search query using the category of the sub-query; and
generate search results for the search query using the category of the sub-query.

18. The application server of claim 17, wherein the pattern is identified and stored in the pattern database by:
for each of a plurality of historical queries that are not categorized:
identifying a portion of the historical query as corresponding to a categorized query from a plurality of categorized queries;
generating the pattern by replacing the portion of the historical query corresponding to the categorized query with the uncategorized variable placeholder portion;
comparing a category of search results for the historical query with a category of the categorized query; and
selecting the pattern for storage in the pattern database based on comparison of the category of search results for each historical query with the category of the categorized query within each historical query.

19. The application server of claim 17, wherein the search results for the search query are generated by:
determining an attribute value based on another portion of the search query; and
identifying the search results using the attribute value and the category of the sub-query.

20. The application server of claim 19, wherein determining the attribute value comprises:
determining an ancillary token based on the search query and the sub-query included in the search query;
determining one or more attributes associated with the category of the sub-query;
determining attribute values for the one or more attributes;
determining a token value based on the ancillary token; and
assigning the token value to the attribute value in response to a comparison of the token value to attribute values for the one or more attributes.

* * * * *